United States Patent [19]
Lasoff et al.

[11] 3,821,735
[45] June 28, 1974

[54] DIGITAL DATA REFRESHING APPARATUS FOR RADAR DISPLAY SYSTEM

[75] Inventors: Murray Lasoff, Downingtown; Raymond C. Baldwin, Lionville; Herman B. Natanblut, King of Prussia, all of Pa.

[73] Assignee: Burroughs Corporation, Detroit, Mich.

[22] Filed: Jan. 29, 1973

[21] Appl. No.: 327,687

[52] U.S. Cl............................ 343/5 DP, 343/5 EM
[51] Int. Cl........................... G01s 7/22, G01s 9/02
[58] Field of Search............ 343/5 DP, 5 PC, 5 EM

[56] References Cited
UNITED STATES PATENTS

| | | | |
|---|---|---|---|
| 3,054,998 | 9/1962 | Cooper et al................... | 343/5 MM |
| 3,094,694 | 6/1963 | Beach............................ | 343/5 EM X |
| 3,188,631 | 6/1965 | Birtley........................... | 343/5 EM |
| 3,388,377 | 6/1968 | Folsom et al.................. | 343/5 DP |
| 3,569,366 | 3/1971 | Dunn et al..................... | 343/5 DP |
| 3,670,330 | 6/1972 | Riggs............................. | 343/5 EM |
| 3,683,373 | 8/1972 | Barnes et al................... | 343/5 DP |

Primary Examiner—Malcolm F. Hubler
Attorney, Agent, or Firm—Leonard C. Brenner; Charles S. Hall; Edward G. Fiorito

[57] ABSTRACT

In an air traffic control system, real-time digitized radar target data is stored in a virtual pushdown stack memory and is repetitively fed to a CRT display system at a rate sufficient to generate a steady flicker-free display. Identification of the data to be displayed as either that derived and stored during the radar antenna's most recent scan or that generated by past scans provides the option of displaying a target's current position by one indicium and its past positions by other indicia whereby a moving target may be displayed as a small symbol followed by a selectable number of trailing dots thereby allowing the observer to readily assess the target's current position, its heading, and by noting the spacing of the dots, its speed. By allocating memory space to the most recent data and discarding the oldest data, graceful degradation occurs in target data overload situations whereby the lost data effects merely a reduction in the number of trailing dots per target.

13 Claims, 13 Drawing Figures

TYPICAL DISPLAY PRESENTATION OF SINGLE MOVING AIRCRAFT

0 TO 12 SEC.    12 TO 24 SEC.    24 TO 36 SEC.    36 TO 48 SEC.    48 TO 60 SEC.    60 TO 72 SEC

1ST SCAN    2ND SCAN    3RD SCAN    4TH SCAN    5TH SCAN    6TH SCAN

NOTES:
1. RADAR ANTENNA SCAN PERIOD SET AT 12 SECONDS
2. TARGET TIME SET TO 12 SECONDS
3. TRAIL TIME SET TO 36 SECONDS

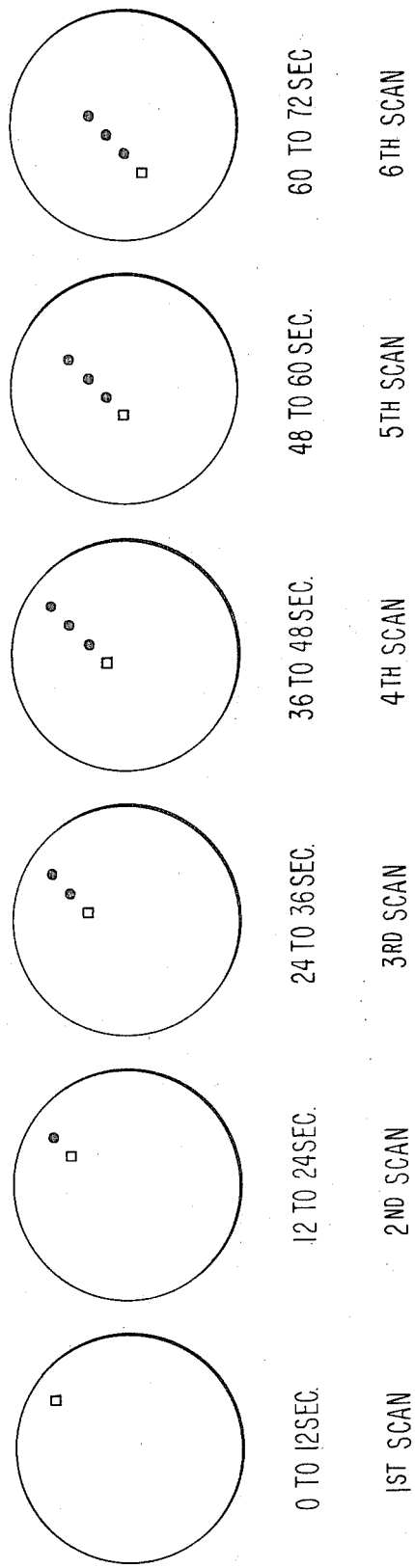

TYPICAL DATA MESSAGE TYPES

| IDLE* | PASSIVE (SEARCH) | ACTIVE (BEACON) | FIELD COUNT | BIT COUNT |
|---|---|---|---|---|
| IDLE FIELD | MSG LABLE | MSG EABLE | FIELD 1 | 1 ↓ 12 |
| PARITY | PARITY | PARITY | PARITY | 13 |
|  | RANGE | RANGE | FIELD 2 | 14 ↓ 25 |
|  | PARITY | PARITY | PARITY | 26 |
|  | AZIMUTH | AZIMUTH | FIELD 3 | 27 ↓ 38 |
|  | PARITY | PARITY | PARITY | 39 |
|  | MISC | MISC | FIELD 4 | 40 ↓ 51 |
|  | PARITY | PARITY | PARITY | 52 |
|  | ZERO | CIVIL ID. | FIELD 5 | 53 ↓ 64 |
|  | PARITY | PARITY | PARITY | 65 |
|  | ZERO | MIL. ID. | FIELD 6 | 66 ↓ 77 |
|  | PARITY | PARITY | PARITY | 78 |
|  | ZERO | ALTITUDE | FIELD 7 | 79 ↓ 90 |
|  | PARITY | PARITY | PARITY | 91 |

*AT LEAST ONE IDLE FIELD TRANSMITTED BETWEEN MESSAGES

*Fig. 2*

CONTROL FIELD BIT NO.

| 12 | 11 | 10 | 9 | 8 | 7 | 6 | 5 | 4 | 3 | 2 | 1 |
|----|----|----|---|---|---|---|---|---|---|---|---|
| DEVICE CONTROL SEGMENT | | | | TIME SEGMENT (LSB = 1/4 SECOND) | | | | | | | |

DEVICE CONTROL SEGMENT FORMAT

| BIT NO. | | FUNCTION |
|---------|---|----------|
| BIT 12 | 1 | BLINK DISPLAY |
|  | 0 | NORMAL DISPLAY |
| BIT 11 | 1 | 7 DATA FIELD MSG (BEACON) |
|  | 0 | 4 DATA FIELD MSG (SEARCH) |

| BIT 10 | BIT 9 | FUNCTION |
|--------|-------|----------|
| 0 | 1 | SINGLE TRANSMIT |
| 1 | 0 | ALLOW TRAIL |
| 1 | 1 | INHIBIT TRAIL |
| 0 | 0 | BYPASS (STATE AFTER SINGLE TRANSMIT) |

TIME SEGMENT CONTROL

| BIT NO. | TIME OF DISPLAY |
|---------|-----------------|
| BIT 8 | 32 SEC. (16 SEC. MAX. USED FOR TRAIL DISPLAY) |
| BIT 7 | 16 SEC. |
| BIT 6 | 8 SEC. |
| BIT 5 | 4 SEC. |
| BIT 4 | 2 SEC. |
| BIT 3 | 1 SEC. |
| BIT 2 | 1/2 SEC. |
| BIT 1 | 1/4 SEC. |

CONTROL FIELD FORMAT

*Fig. 3*

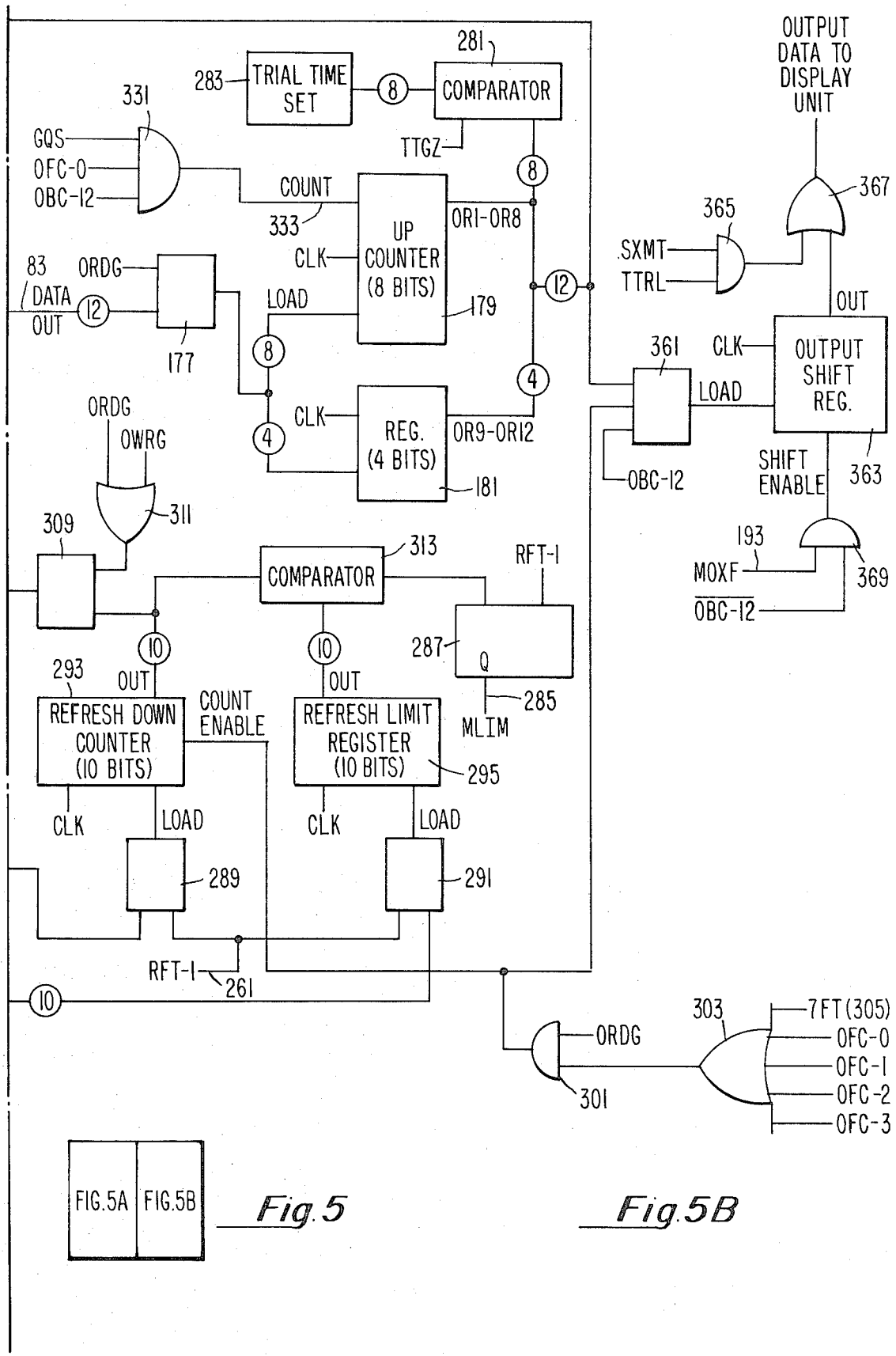

DIGITAL DATA REFRESHING APPARATUS FOR RADAR DISPLAY SYSTEM

BACKGROUND OF THE INVENTION

This invention in the field of air traffic control display systems relates to a memory and control logic system for use in conjunction with a CRT display system for generating a flicker-free display of current and past target positional information.

In many modern air traffic control systems the target data derived from the main radar site is digitized and sent via modems over a plurality of communication lines through receiving modems and receiving data buffers to radar display consoles where the data is further processed through D-to-A converters and modulates CRT display systems for reconstruction and display purposes. Frequently, the displayed data may be viewed only for short periods of time dependent upon the persistence of the CRT phosphor. In the present invention this viewing limitation is overcome by storing the incoming data and repeatedly refreshing the CRT display system with the stored data at a rate sufficient to generate a flicker-free display.

The prior art teaches methods for generating steady displays of current and past target positional information through the use of CRT storage tubes, resolvers, switching matrices and other circuitry. The prior art is therefore relatively expensive and unreliable. Furthermore, the prior art does not teach methods and apparatus for providing graceful degradation in overload radar target data situations whereby the newest data is displayed and the oldest data is discarded.

It is therefore a primary object of this invention to provide an inexpensive, reliable, solid-state digital system for generating a steady flicker-free display of radar target data.

It is another object of this invention to provide graceful degradation in overload target data situations whereby the newest data is displayed and the oldest data discarded.

It is another object of this invention to provide a selectable display control apparatus for setting the display time of a radar target data message.

It is a further object of this invention to provide an apparatus for permitting the display of the target data messages generated during the most recent scan of radar antenna by one indicum and the target data messages generated during previous scans by another indicia.

The foregoing and other objects, features and advantages of the invention will be apparent from the following more particular description of a preferred embodiment of the invention, as illustrated in the accompanying drawings.

SUMMARY OF THE INVENTION

The fulfilling the above objects there is disclosed a refresh system including a virtual push-down stack memory for storing digitized radar target data messages. The stored messages are repeatedly and nondestructively read out of the memory and sent to a display system for a selectable period of time at a rate responsive to the persistance characteristics of the display system to generate a steady flicker-free display of the target data message. Identification of the data to be displayed as either that derived and stored during the radar antenna's most recent scan or that generated by pass scans provides an option of displaying a target's current position by one indicium and its past positions by other indicia whereby a moving target may be displayed as a small symbol followed by a selectable number of trailing dots thereby allowing the observer to readily assess the target's current position, its heading, and by noting the spacing of the dots, its speed. By allocating memory space to the most recent data and discarding the oldest data, graceful degradation occurs in target data overload situations whereby the lost data effects merely a reduction in the number of trailing dots per target.

DESCRIPTION OF THE DRAWINGS

The above and other objects, advantages and features of the present invention will become more readily apparent from a review of the specification when taken in conjunction with the drawings wherein:

FIG. 1 illustrates a typical CRT display presentation of a single moving aircraft;

FIG. 2 shows the format of a typical input data message to be processed;

FIG. 3 shows the format of a control field which is appended to the beginning of each received data message;

FIG. 5 shows the connection of FIG. 5A to FIG. 5B.

FIGS. 5A and 5B is a schematic of a refresh system including input, store, output and refresh circuitry;

DESCRIPTION OF THE PREFERRED EMBODIMENT

Figure 4:
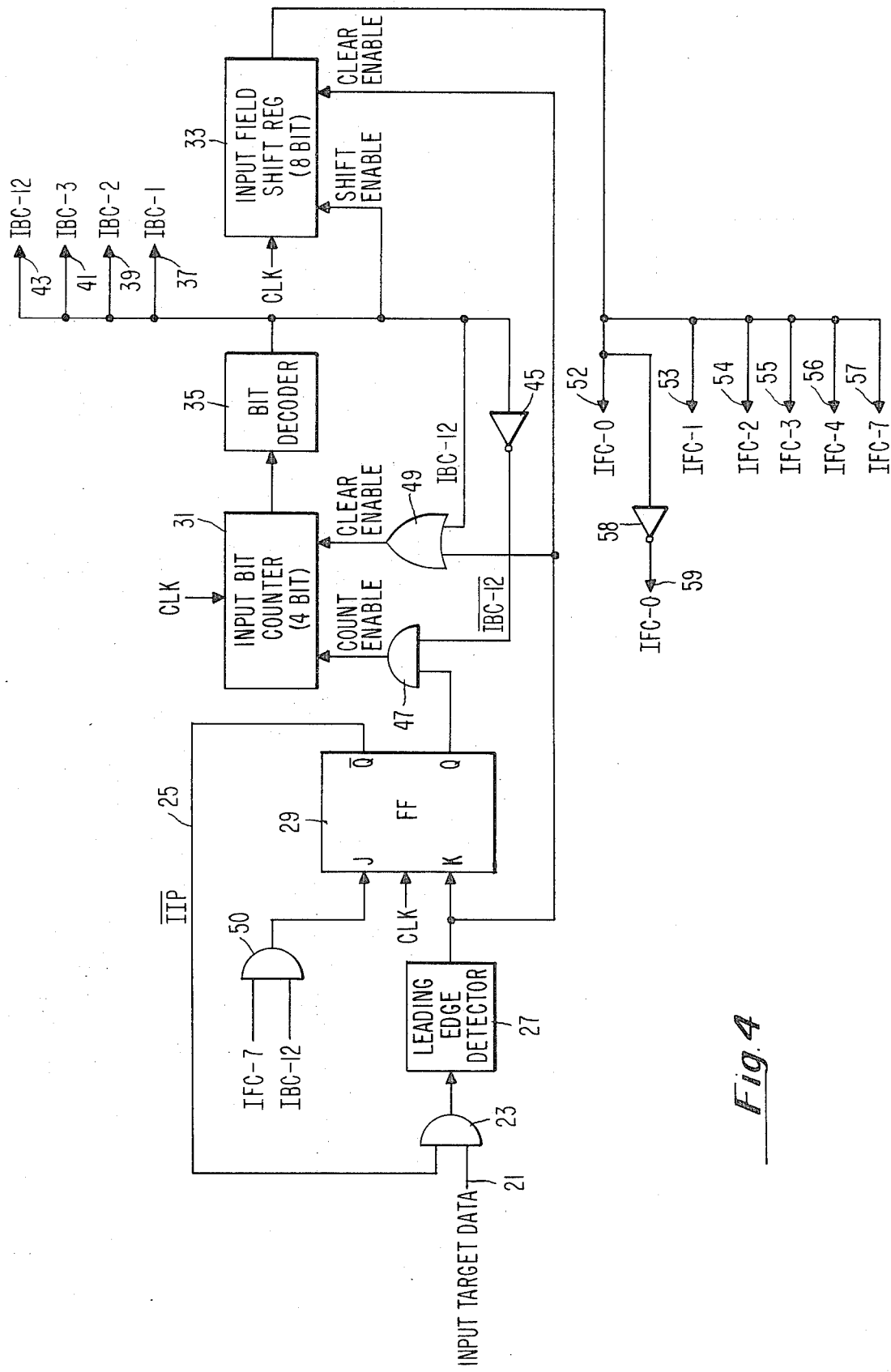
FIG. 4 is a block diagram of logic employed to count the bits and fields of the input data message.

To facilitate a better understanding, the present invention will be described as employed in the environment of a modern air traffic control system wherein the target data derived from a main radar site is digitized and sent via modems over a plurality of communication lines through receiving modems to radar display counsels where the data is further processed through digital to analog converters and modulates a CRT display systems for reconstruction and display purposes. The refresh system of the present invention is interposed in such a (air traffic control) system between a receiving modem and a display counsel to store and update target data and to provide data to the display counsel in such a manner as to generate an improved target display presentation as will hereinafter be described.

In the preferred embodiment the digitized radar target data being received by the refresh system contains messages of seven fields wherein each field comprises 12 information bits and each field is separated from another field by a parity bit, see FIG. 2. The refresh system may, of course, be configured to accomodate other message formats if required. Upon recognition of an incoming message, an input data bit and field counter is enabled to keep track of the incoming bits and fields for control purposes. A suitable clock which may run in the order of 3 mHz is used to shift the incoming data bit-by-bit into a 15 bit input shift register and to pulse the input data bit and field counter. The input and output of the refresh system being serial, transfers data in serial 12 bit-parity cyclical pattern whereas the refresh system itself, being parallel in nature, transfers the data in parallel during the input and output parity bit clock time period. The first field of the input data is a label field and includes an information bit denoting whether the message is a search type message with four information fields (derived solely from the radar antenna data) and three fields of all zeros or a beacon type message having seven information fields derived from combined radar antenna data and onboard aircraft radio data. As soon as the first field is present in the input shift register, the label information is decoded and logic signals are generated which will cause the refresh system memory to store all seven fields of a beacon type message, and only the first four fields of a search type message, thereby conserving memory space by not storing the three all zero fields of a search type message. The memory utilized in the preferred embodiment is of a virtual push down stack organization operating on a last in, first out principle so that the most recent data is always read out first while only the oldest data is discarded in the case of memory saturation.

In the preferred embodiment, data in memory is read out once every 24 milliseconds and sent to the radar CRT display system to provide a steady flicker-free presentation of the data. The length of time of display of a single message is controlled by two sets of switches associated with the refresh system wherein the first set of switches controls the target time display representing current target positional information and is adjustable in ¼ second increments from zero to 15.75 seconds. Normally, the target switches are set to equal the period of the traffic control radar antenna rotation and the CRT display system displays the target position by a small diamond, square or other appropriate symbol. The second set of switches controls the trail time display representing past target positional information and may be set from zero to 47.75 seconds in one-quarter (0.25) second increments. Normally, the trail switches are set for a period equal to three antenna rotation periods. The trail period is initiated by the expiration of the target display period. A logical level is generated during the time of trail display and is appended to the beginning of the outgoing message so that the display system will have a logical indication that the message being received should be displayed by trail indicia and not by target indicia. The messages transferred out to the CRT display system are counted bit-by-bit and field-by-field to generate timing signals for control purposes. When a search message, wherein only four fields are stored in memory, is being outputted, an additional three fields of zeros are added, so that each message transferred to the CRT display system comprises seven fields. Each field is separated by a zero bit since parity is not required at this stage.

The system configuration and operational details given above have been presented in simplified form. Other features of the invention will become more fully apparent in a more detailed description presented hereinafter.

FIG. 1 illustrates a typical CRT display presentation as a result of the instant invention. Shown in FIG. 1 is a single moving target with the target display time set equal to the traffic control radar antenna scanning period and the target trail display time set equal to three times the radar antenna scan period. The display shows the current position of the target as a square or diamond-shaped symbol, and past positions of the target as trailing dots. The target's heading and an indication of its speed is conveyed to an observer by the position and spacing of the trailing dots. If the trail display time is set to "N" times the radar antenna scan period then "N" trailing dots will be displaced, thereby allowing the display to be optimized as a function of varying traffic density situations and operator preferences.

FIG. 2 illustrates the typical format of an incoming digitized target data. Each message unit comprises seven binary coded fields of 12 bits per field, separated by parity bits between fields. The first field (field 1) is a label field and includes an information bit identifying whether the message is a search type message which is generated entirely from the information generated by the air traffic control radar system, or a beacon-type message comprising a composite of radar information and aircraft beacon information. The second field (field 2) comprises digitized range information, signifying the distance of the detected aircraft from the radar site. The third field (field 3) comprises digitized azimuth information signifying the detection angle of the aircraft with respect to the radar site. The fourth field (field 4) comprises additional binary information. Where the message is of the search-type, the fifth, sixth and seventh fields are filled with zeros. Where the message is of beacon-type, field 5 comprises civilian identification information, while field 6 comprises military identification information, and field 7 provides altitude information which is rated by the altimeter system of the detected aircraft.

The control field which is appended to the beginning of every input target data message and is therefore often referred to as field 0 is shown in FIG. 3. The information in this field is used to generate control signals required for the transfer and storage of the target data message within the refresh system. Field 0 is deleted from the target data message before outputting the message from the refresh system to the CRT display unit. As indicated in FIG. 3, the control field comprises 12 bits wherein bits 1 through 8 specify the display time of an attached message, and bits 9 through 12 determine other refresh system control functions as will be described.

If field 1 of the input target data message includes an information bit denoting that the message is an emergency message, bit 12 of the appended control field may be set to a logical 1 by standard decoding techniques known in the art. If desired, detection circuitry may be incorporated in the refresh system to recognize the presence of the control field having a bit 12 set to a logical 1 and to generate a signal which may be used with the incorporation of additional circuitry to blink the display of this message or otherwise indicate its emergency nature. Normally, bit 12 is set to a logical zero and the message display presentation is steady. The message field 1 will include an information bit identifying the input message as being either of the beacon type or search type, thereby setting bit 11 of the control field via a standard decoding circuitry to either a logical one (representing the message is of beacon type having seven information fields) or to a logical zero (representing the message is of search type having four information fields followed by three fields of all zeros.

Bits 9 and 10 of the control field control the display presentation of the appended target data message. For normal search and beacon type messages, bit 9 is set to logical zero and bit 10 is set to logical one. Such a setting for bits 9 and 10 will allow the target to be displayed by a target symbol (a square or diamond) for the target set period, and by trailing dots for the trail set time period. Other bit settings for bits 9 and 10 of a control field will result in different presentation modes as will be described hereinafter.

Bits 1 through 8 of the control field determine the display time of the appended message. Bits 7 and 8 of the control field are initially set to logical one for reasons which will hereinafter become apparent. The initial setting of bits 1 through 6 will determine the target display time of the attached input message. These bits represent a binary coding of time with bit 1 being the least significant bit and representing one-quarter (0.25) of a second. Target time set circuitry, which will be later described, is provided to initially set bits 1 through 6 to the complementary binary representation of the desired target display time. After being initially set, bits 1 through 6 are counter-up in one quarter second increments until bits 1 through 6 all equal a logical zero. When bits 1 through 6 are all set to a logical zero level, this will indicate that the target display time has expired and that the trail display period is initiated. Bits 1 through 6 will continue to be counted up once every quarter second until they coincide in binary representation to the time setting of the trail time set controls of the refresh system.

The employment of the control field will be described in more specific detail in the following description of the refresh system.

For control purposes, the input data message bits and fields are counted by the input data bit and field logic shown in FIG. 4. The field 1 message label of each input target data message begins with the first bit of the field set to a logical one which, when set via an input target data line 21 through an AND gate 23, triggers a leading edge detector 27. Detector 27 generates a single clock-synchronized output pulse upon receipt of a logical one signal from AND gate 23. Detector 27 may be of the circuit type disclosed in U.S. Pat. No. 3,471,789 issued to Nutting, et al, and assigned to the assignee of the present invention. The clock-synchronized output pulse is used to clear to zero count an input bit counter 31 and an input field shift register 33. In addition, the output of detector 27 is used to set a JK flip-flop 29 thereby producing a logical zero on the JK flip-flop $\overline{Q}$ output line 25 hereinafter referred to as the NOT IIP ($\overline{IIP}$) line 25 since a logical one thereupon indicates that a message is not incoming and therefore an input is not in progress. The $\overline{IIP}$ line 25 is fed back as a second input of AND gate 23 to block all bits other than the first bit of an input data message from triggering the leading edge detector 27.

Upon clearing, the input bit counter 31 begins counting up one bit per clock pulse. The exact bit count is decoded in a conventional manner by a four output bit decoder 36 which provides particular recognition of input bit counts 1, 2, 3, and 12 only. The four outputs of bit decoder 35 are the IBC-1 output 37, the IBC-2 output 39, the IBC-3 output 41, and the IBC-12 output 43, respectively. The IBC-12 output 43 is fed through an inverter 45 to generate a NOT bit count 12 ($\overline{IBC\text{-}12}$) input to a count enable AND gate 47 whose second input is connected to Q output of the JK flip-flop 29. The output of AND gate 47 is applied as the count enable input to the input bit counter 31. Thus, when the JK flip-flop 29 is set, the input bit counter 31 begins counting from count 0 to count 12 at the rate of one count per clock pulse. The IBC-12 output 43 of bit decoder 35 is also fed through OR gate 49, the output of which is applied as the clear enable input to the input bit counter 35, so that the clock pulse following input bit count 12 will set the input bit counter 31 to count zero.

Each time the input bit counter 31 cycles through input bit count 12, a shift enable input 51 of the input field shift register 33 is activated by the IBC-12 output 43 of the bit decoder 35 so that the next clock pulse will shift the data in the input shift register 33 one bit. Although the preferred embodiment employs a shift register for counting input fields, a binary field counter and field decoder may be utilized as was described at the input bit level. Logic recognition of the input field count 0, 1, 2, 3, 4, and 7 is provided by the six outputs of the input field shift register 33, namely, the IFC-0 output 52, the IFC-1 output 53, the IFC-2 output 54, the IFC-3 output 55, the IFC-4 output 56 and the IFC-7 output 57, respectively. The IFC-0 output 52 is fed through an inverter 58 to generate the NOT IFC-0 ($\overline{IFC\text{-}0}$) output 59. With the IFC-7 output 57 of the input shift register 33 and IBC-12 output 43 of the bit decoder 35 applied as inputs to an AND gate 50, an output signal is produced by AND gate 50 at a bit count of 12 and a field count of 7, which when applied to the J input of the JK flip-flop 29, sets a logical one on the $\overline{IIP}$ output line 25 and stops the counting process by also setting the Q output of the JK flip-flop 29 to zero. The Q output of the JK flip-flop 29 is applied as an input to the AND gate 47. Thus, a logical zero at the Q output of the JK flip-flop 29 places a blocking input signal on the AND gate 47. Moreover, upon detection of an incoming target data message, the input data bit and field logic counts at the clock pulse rate through seven fields of 13 bits and generates recognition outputs for certain input bit counts and input field counts which are required for control purposes by the refresh system.

Figure 5A:
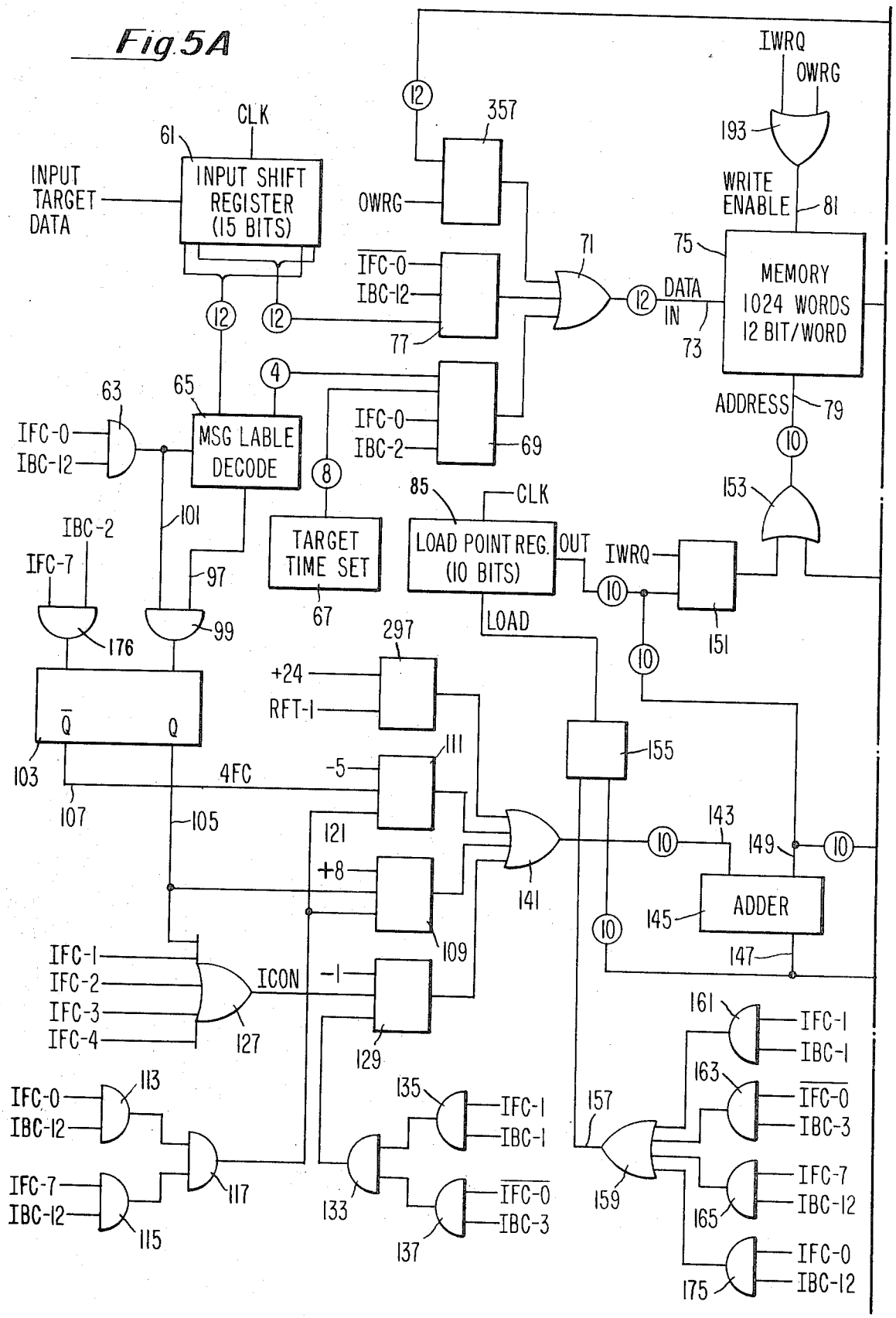

FIG. 5 shows the refresh system for receiving, storing, and repeatedly outputting target data messages of the type shown in FIG. 2. As the first bit of the data message initiates the input bit and field counter logic shown in FIG. 4, data begins being clocked bit by bit into a 15 bit input shift register 61.

After the first 12 bits of the data message representing label field 1 have been loaded into the input shift register 61, the input bit counter 31 will be at count 12 and the input field shift register 33 will be at count 0.

At this time, the IBC-12 output 43 of the bit decoder 35 and IFC-0 output 52 of the input field shift register 33 will enable a load AND gate 63 which acts to transfer in parallel the first 12 bits of the input shift register 61 into a message label decoder 65, wherein the target data message label field 1 is decoded by standard techniques into bits 9 through 12 of the control field 0 as shown in FIG. 3. If label field 1 includes an information bit denoting the target data messages as an emergency message, bit 12 will be set to a logical one; otherwise, bit 12 of field 1 of the data message will be set to a logical zero. The label field 1 will always include an information bit denoting the target data message as being either of the search or beacon type, whereupon bit 11 of the control field 0 will be set either to a logical 0 for a search type message, or a logical 1 for a beacon type message. For normal search and beacon type messages, bit 10 of the control field 0 is set to a logical one and bit 9 is set to a logical zero. In circumstances where the label field 1 includes an information bit signifying that it is desirable to display the message only as target symbols rather than a target symbol followed by trailing dots, then bits 9 and 10 of the control field 9 are both set to a logical one level. Where the label field 1 includes an information bit denoting the messages is a test or otherwise special message, bit 10 of the control field 0 will be set to a logical zero level and bit 9 will be set to a logical zero level and bit 9 will be set to a logical one level.

The following detailed discussion will focus on the normal search and beacon message type display mode while the other possible display modes will be mentioned only to illustrate the inherent display flexibility of the present invention.

Bits 1 through 6 of the control field 0, which determine the data message target display time, are set as a function of a target time set control 67 which comprises a manually setable switch or set of switches. Although the target display time is selectable from 0 to 15.75 seconds in one-quarter of a second increments, the normal operation target time is chosen to equal the time required for one radar antenna ratation. Bits 1 through 6 are set to represent the binary complement of the target time chosen with bit 1 being the least significant bit and representing one-quarter of a second. As bits 1 through 6 are counted down in one-quarter of a second increments, bits 1 through 6 will all be zero after the set target time has expired. The target time set control 67 also functions to set bits 7 and 8 of the control field 0 to a logical one level for reasons discussed hereinafter.

Four lines of data representing bits 9 through 12 of a control field 0 provided by the message label decoder 65, and eight lines of data representing bits 1 through 8 (of the control field 0) provided by the target time set 67 are applied as the data inputs to a control AND circuit 69. A control AND circuit as defined in this specification describes a logic circuit for controlling data flow having data inputs, data outputs, and control inputs wherein data flow through the circuit occurs only when all control inputs are at a logical one level. An electro-mechanical illustration of such a circuit is a multipole relay wherein control signals energizing the relay coil inhibits or allows data flow across the relay contacts. The preferred embodiment utilizes a solid-state version of the multiple-pole relay to improve speed and reliability. The control AND circuit 69 has as control inputs the IFC-0 output 52 and the IBC-12 output 43 and allows data to flow through the control AND circuit 69 to a memory input OR gate 71 only at the time when the input field count is 0 and the input bit count is 12.

In operation, the memory input OR gate 71 functions to funnel three sets of 12 data lines each into a 12 bit data input 73 of a memory 75. Control field 0 of the data message enters the memory input OR gate 71 via a set of data lines outputting the control AND circuit 69 at the time when the input field count is 0 and the input bit count is 12 and the target data label field 1 has been shifted into the first twelve stages of input shift register 61. Three clock periods later at an input field count of 1 and an input bit count of 2, the control AND circuit 75, whose 12 data inputs are derived from the last 12 stages of the 15 stage input shift register 61 and whose control inputs are derived from $\overline{IFC-0}$ output 59 and IBC-2 output 39, passes in parallel the 12 bit label field 1 of the incoming target data message via an outputting set of data lines through memory input OR gate 71 to the memory data input 73. Thereafter, for fields 2 through 7 of an incoming target data message, a 12 bit message field is transferred from the last 12 stages of the input shift register 61 via a control AND circuit 77 and the memory input OR gate 71 to the memory data input 73 every time the input bit counter 31 passes through bit count 2.

Figure 6:
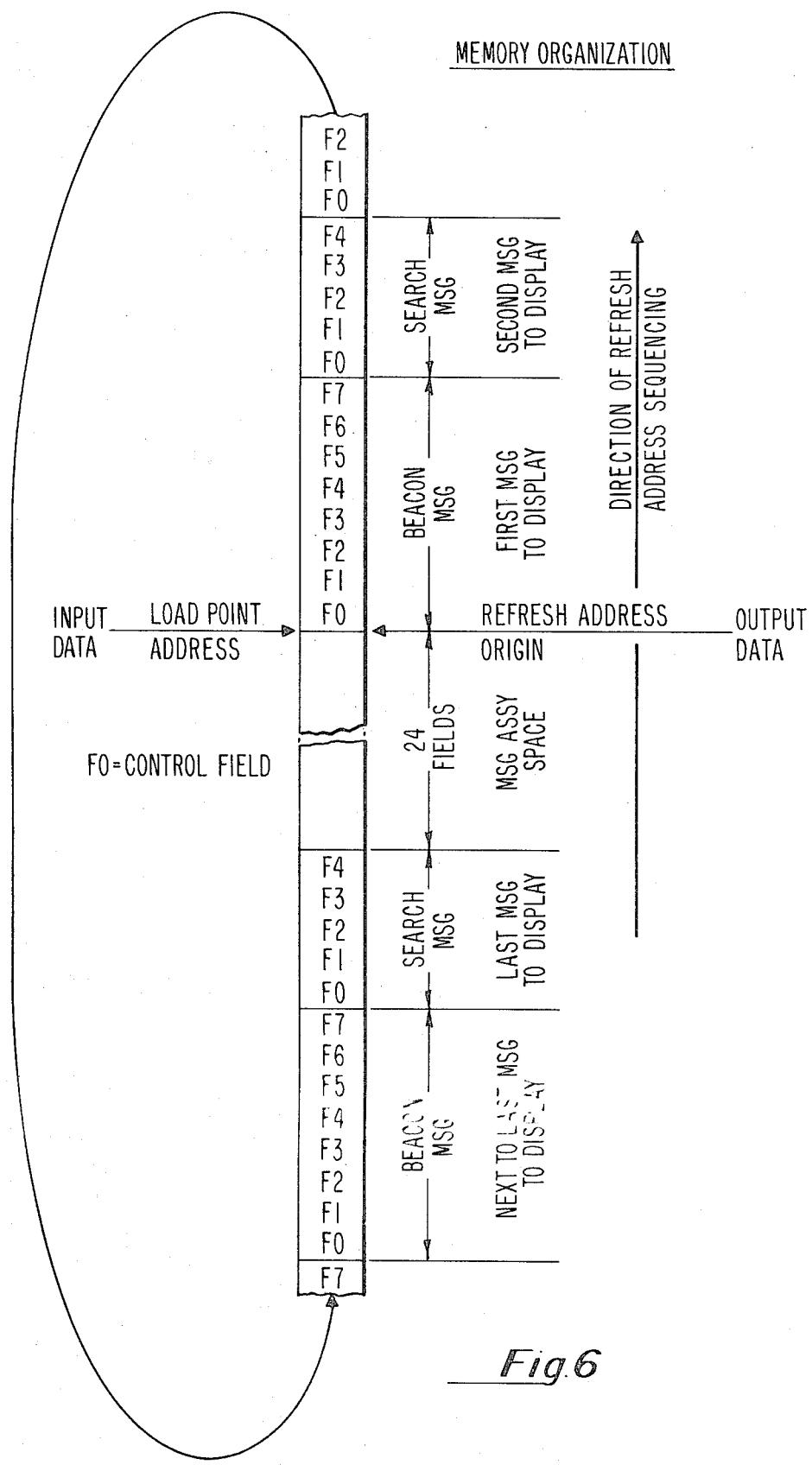
FIG. 6 depicts the memory organization of a refresh memory utilized in the refresh system of FIG. 5.

Thus, as described, an input target data message comprising seven 12-bit fields is transferred field by field to the memory data input 73 and is preceded by a 12-bit control field 0, which is generated as a function of the decoded target data label field 1 and the target time set control 67. Whether or not the fields arriving at the memory data input 73 are actually written into memory, and, if so, at what memory address, will be described next in a discussion of the memory 75. With continued reference to FIG. 5 and specific reference to FIG. 6, the memory 75, in the preferred embodiment, is a high speed random access memory organized in a virtual pushdown stack for storing 1,024 12-bit words. The memory size, of course, may be varied as function of radar and display system requirements. The 12-bits of parallel data at the memory data input 73 is read into memory 75 at an address determined by a memory address input 79 whenever a logical one appears on a memory write enable input 81 to the memory 75. The memory address input 79 accepts a 10-bit parallel binary encoded number which determines both the input and output word addresses of the memory 75. Whenever a logical zero is present at the memory write enable input 81, a parallel 12-bit word is available to be read out from a memory data output 83 as determined by the memory address input 79.

The 1,024 12-bit fields of the memory 75 are packed in ascending order, field by field, with incoming target data messages, wherein each beacon type message stored comprises one control field and seven data fields and each search type message stored comprises one control field and four data fields. In the preferred embodiment, 24 memory fields are reserved for input message assembly, leaving 1,000 memory fields available for repeated outputting to refresh the display unit in a manner which will be later detailed. With this arrangement, 125 beacon type target messages or 200 search type messages will saturate the memory 75. In a mixed environment, the capacity of the memory 75 lies between 125 and 200 target data messages.

The address for inputting data into the memory 75 is determined by a 10-bit binary address number stored in a load point register 85 which outputs the address number in parallel to the data input of a control AND circuit 151 whose control input is an input write request signal (IWRQ) 93. The generation of IWRQ signal 93 will be described hereinafter. When a IWRQ signal 93 is present, the 10-bit address data flows in parallel from the load point register 85 through the control AND circuit 151 and an address OR gate 153 to memory address input 79 of the memory 75. target message is of the beacon type, sets a flip-flop 103 placing a logical one on the Q output 105 of the flip-flop 103 hereinafter referred to as the 7FC output 105, since a logical one on this output indicates that the incoming message is of the beacon type and that all seven message fields are to be counted and stored. The $\bar{Q}$ output 107 of the flip-flop 103, hereinafter referred to as the 4FC output 107, indicates by a logical one thereupon, that the incoming message is of search type and that only its first four fields are to be stored in the memory 75. The 7FC output 105 and the 4FC output 107 provide control inputs to a control AND circuit 109 and control and circuit 111, respectively.

The generation of other control and data inputs for the control AND circuits 109 and 111 will now be described. An AND gate 113 receives as inputs the IFC-0 output 52 and IBC-12 output 43. An AND gate 115 receives as inputs, the IFC-7 output 57 and the IBC-12 output 43. Both the AND gates 113 and 115 feed an OR gate 117 which generates as an output, a start-stop signal 119 which provides a control input to the control AND circuits 109 and 111 and is used in initializing and finalizing the memory address count during the storing of an incoming target data message. A data input 121 to control AND circuit 109 is a pre-wired 10 line parallel binary representation of the numeral eight (8). Similarly, a data input 123 to the control AND circuit 111 is a prewired ten line parallel binary representation of the numeral four (4).

As a new target data message enters the input shift register 61, the load point register 85 will be storing the field 0 address of the previously loaded input target data message. In a manner which will be described later, the stored address is jumped ahead eight locations for an incoming beacon message, and five locations for an incoming search message. Thereupon, field 0 of the new message is loaded into the memory 75 and the stored memory address is moved back one location for the loading of field 1 of the new message. The address is continually back-stepped, field by field, until either field 7 of a beacon type message or field 4 of a search type message is loaded one address location ahead of field 0 of the previously loaded target data message. After loading the control field 0 and the first four fields of a search type message or all seven fields of a beacon type message, the memory address stored in the load point register 61 is jumped forward five or eight locations as required by the field 0 address of the currently loaded target data message. To accomplish the above-described loading sequence, bit 11 of field 0, which indicates that the incoming target data message is of beacon type by a logical one and of search type by a logical zero, is passed from the message label decoder 65 to a first input 97 of AND gate 99, the second input 101 of AND gate 99 receives an enable load signal from the output of the AND gate 63, which generates a logical one at the time corresponding to an input field count of 0 and an input bit count of 12. A logical one output from the AND gate 99 which occurs at the time corresponding to an input field count of 0 and an input bit count of 12 if the incoming Another important input control signal is an ICON output 125 of an OR gate 127 which has as inputs the 7FC output 105 of the flip-flop 103, IFC-1 output 53 of the input field shift register 33, the IFC-2 output 54, the IFC-3 output 55, and the IFC-4 output 56. For an incoming beacon message, the ICON output 121 is at logical one from input field count 0 and input bit count 12 to input field count 7 and input bit count 2. For an incoming search message the ICON output 125 of the OR gate 127 is a logical one only until an input field count of 4 and an input bit count of 12 is reached. The primary function of the ICON output 125 is to provide the proper addressing and input write control signals for loading all seven fields of a search type message into the memory 75.

A third control AND circuit of importance in generating address control signals in addition to the control AND circuits 109 and 111 is a control AND circuit 129 having as control inputs the ICON output 125 of the OR gate 127 and a count-down output 131 of a OR gate 133 which is fed by an AND gate 135 having as inputs the IFC-1 output 53 of the input field shift register 33 and the IBC-1 output 37 of the bit decoder 35; and by an AND gate 137 having as inputs the $\overline{\text{IFC-0}}$ output 59 and the IBC-3 output 41. A data input 139 to the control AND circuit 129 is a pre-wired ten line parallel binary representation of the binary numeral minus one (−1).

Binary numerical data is funneled from the control AND circuits 109, 111, and 129 through an OR gate 141 to a first adder input 143 of an adder 145. The adder 145 produces a 10 bit parallel number at an adder output 147 which is the sum of a 10-bit parallel binary number on the first adder input 143 and a 10-bit parallel binary number on a second adder input 149, which equals the number stored in the load point shift register 85. The load point shift register 85 addresses the memory 75 via a control AND circuit 151, an address OR gate 153 and the memory address input 79, as will be described. When it is necessary to modify the memory address for inputting target message fields, the adder output 147 is loaded through a control AND circuit 155 into the load point shift register 85. The control AND circuit 155 is controlled by a load output 157 of an OR gate 159 which is fed by an AND gate 161 having as inputs the IFC-1 output 53 of the input field shift register 33 and the IBC-1 output 37 of the bit decoder 35; an AND gate 163 having as inputs IFC-0 output 59 of the input field shift register 33 and the IBC-3 output 41; an AND gate 165 having as inputs the IFC-7 output 57 and the OBC-12 output 43; an AND gate 175 having as inputs the IFC-0 output 52 and the IBC-12 output 43.

Figure 8:
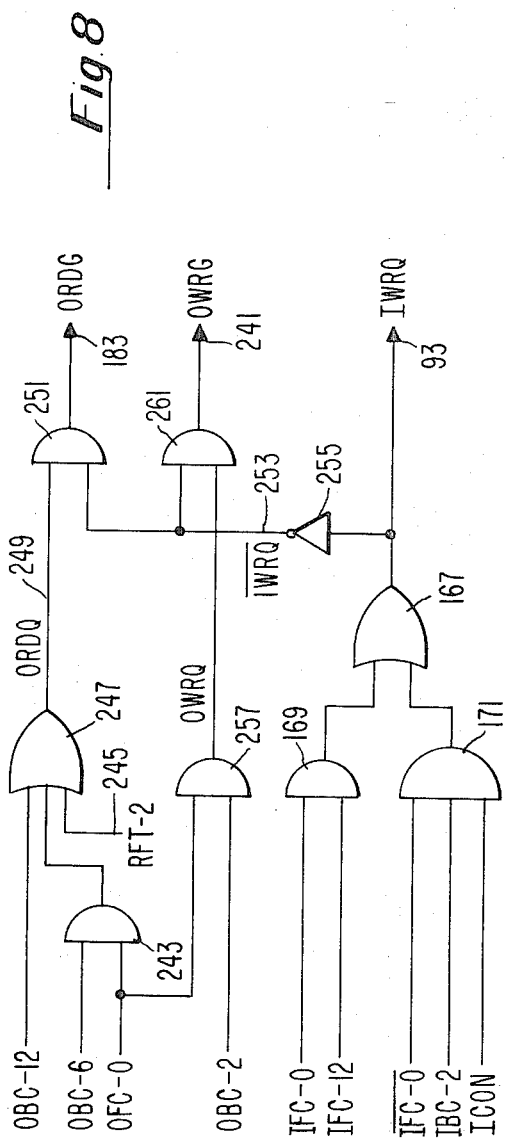
FIG. 8 is a diagram of a memory read and write control logic circuit utilized to generate memory control signals for the refresh system of FIG. 5.

With continued reference to FIG. 5 and specific reference to FIG. 8, the IWRQ signal 93 is generated by an OR gate 167 which is fed by an AND gate 169 having as inputs the IFC-0 output 52 and the IBC-12 output 43; and an AND gate 171 having as inputs the IFC-0 output 52, the IBC-2 output 39, and the ICON output 125. Thus, the IWRQ signal 93 is a logical one at an input field count of 0 and an input bit count of 12; at an input bit count of 2 for the first four fields of an incoming type message; and at an input bit count of 2 for all seven fields of an incoming beacon type message. The IWRQ signal 93 is applied through an OR gate 193 to the write enable input 81 of the memory 75 to enter into the memory 75 the message field at the data input 73 of the memory 75 at the memory representation present at memory address input 79 of the memory 75. Also, the IWRQ signal 93 enables the control AND circuit 151 to pass address data stored in the load point register 85 through the control AND circuit 151 and OR gate 153 to the memory address input 79 of the memory 75.

In loading an input target message into the memory 75, at an input field count of 0 and an input bit count of 12, data representing the binary number 8 for a beacon type message or the binary number 4 for a search type message is added by the adder 145 to the field 0 address of the previous message stored in the load point register 85. The updated address is fed back into the load register 85 and out to the memory address input 79, so that the incoming field 0 is loaded at the updated address. Thereafter, in similar fashion, the memory address is decremented a bit at a time as field 1 and following fields of an incoming message are loaded into the memory 75. After the first four fields of a search type message and all seven fields of a beacon type message have been loaded into the memory 75, the memory address is reset five or eight bits as required to the currently stored field 0 address of the incoming message. Following the loading of a message, an AND gate 176 which has as inputs the IFC-7 output 57 and the IBC-12 output 43, generates a logical one and thereby resets 4FC output 107 of the flip-flop 103 to a logical one level and the 7FC output 105 to a logical zero level.

Figure 7:
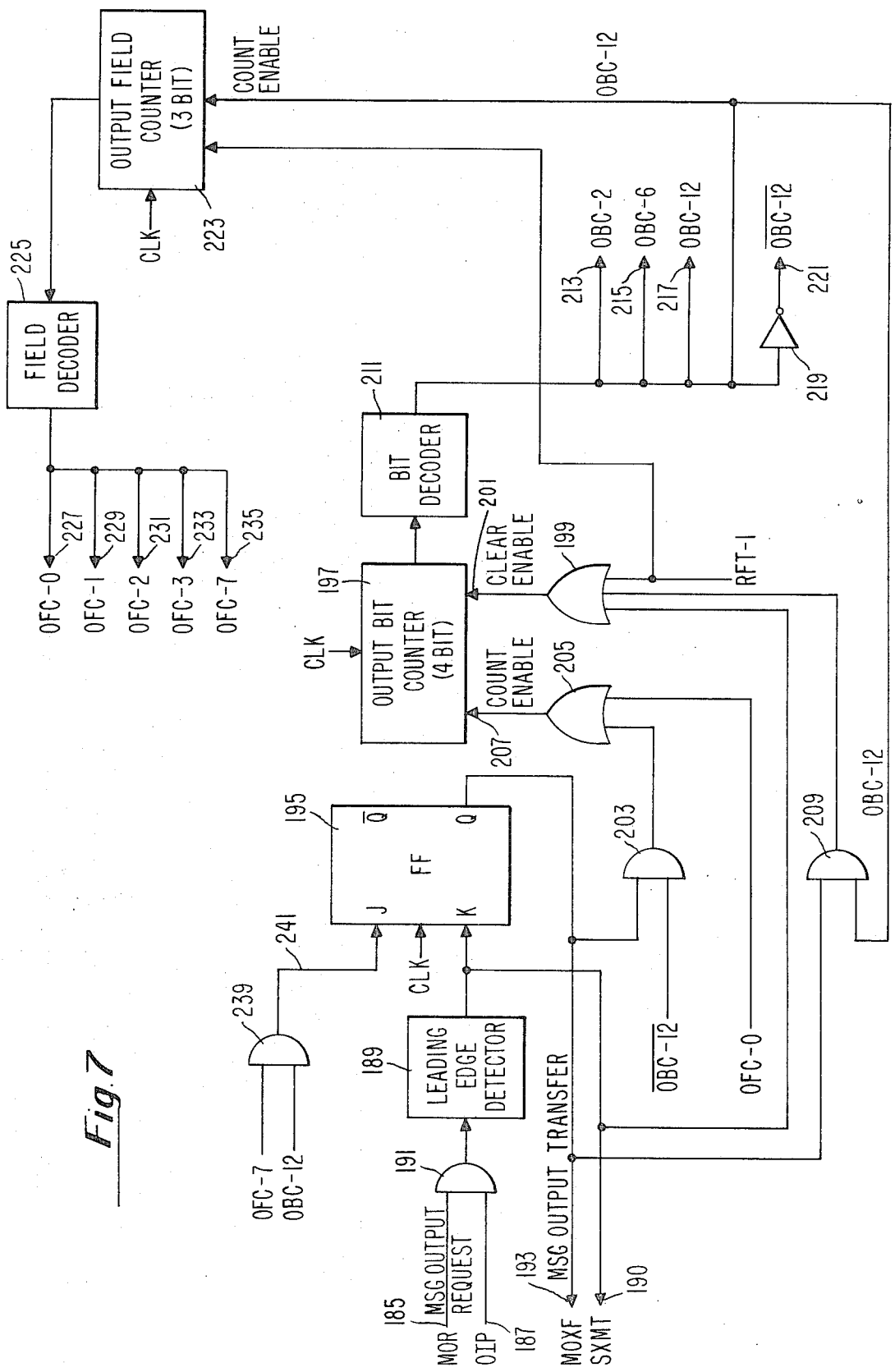
FIG. 7 is a schematic of an output data bit and field counter logic circuit provided to generate output control signals utilized in the refresh system of FIG. 5.

Target data messages stored in the memory 75 are read out therefrom through the data output 83 of the memory 75 when control a AND circuit 177 is enabled by a signal from a output read request granted (ORDG) output 183 (see. FIG. 8) to pass bits 1 through 8 of the field being read into an eight bit up-counter 179 and bits 9 through 12 into a four bit register 181. Since the ORDG output 183 and other output controls are generated as a function of the output bit and field counts, a like number of input controls are generated as a function of the input bit and field counts. The output bit and field counter logic will now be described with reference to FIG. 7.

A message output request (MOR) signal 185 generated by the associated CRT display system indicates by a logical one that the display is ready for a new target data messages. An output-in-progress (OIP) signal 187 generated by a refresh control logic within the refresh system, as will be hereinafter described, indicates that the refresh system is ready to output the target data messages. A leading edge detector 189 driven by an AND gate 191, which has as inputs the MOR signal 185 and the OIP signal 187, generates an output-initialing single clock-synchronized signal, hereinafter referred to as a SXMT signal 190, when an output is requested and the refresh system is ready to output. The leading edge detector 189 is similar in design and function to the leading edge detector 27. The SXMT signal 190 is used to set output, hereinafter called message output transfer MOXF output 193, of a JK flip-flop 195 to a logical one. Note that because the JK flip-flop 195 is clocked, the SXMT signal 190 generates a logical one pulse one clock period before the MOXF output 193 is set to a logical one level. SXMT signal 190 is utilized to clear an output bit counter 197 to zero through an OR gate 199 and an clear enable input 201 to the output bit counter 197. The MOX output 193 is applied through an bit count enable AND gate 203 and an OR gate 205 to an output bit counter enable input 207 and through an bit clear enable AND gate 209, and an OR gate 199 to the clear enable input 201.

In the preferred embodiment, the MOXF output 193 is also sent out to the associated CRT display system to reset to a logical zero level the MOR signal 185. The count of output bit counter 197 is decoded in a conventional manner by a bit decoder 211 which produces a logical one for a bit count of 2 on an OBC-2 output 213; or a bit count of 6 on an OBC-6 output 215; and for a bit count of 12 on an OBC-12 output 217. The OBC-12 output 217 feeds an inverter 219 thereby producing a NOT OBC-12 ($\overline{OBC\text{-}12}$) output 211 which is at a logical one level for all bit counts except a bit count of 12. The $\overline{OBC\text{-}12}$ output 221 is fed back to the bit count enable AND gate 203 and the OBC-12 output 217 is fed back to the bit clear enable AND gate 209 thereby causing the output bit counter 197 to cycle from a bit count of 0 to a bit count of 12 during the time a logical one is present on the MOXF output 193. The OBC-12 output 217 also enables a three-bit output field counter 223, so that a field count stored therein is incremented by one everytime the input bit counter 197 cycles through a count of 12. The output field count is decoded by a five output field decoder 225 which generates a logical one level on an OFC-0 output 227 at an output field count of 0; an OFC-1 output 229 at an output field count of 1; an OFC-2 output 231 at an output field count of 2; an OFC-3 output 233 at an output field count of 3; and an OFC-7 output 235 at an output field count of 7. The OFC-7 output 237 and the OBC-12 output 217 feed an AND gate 239 generating a logical one reset signal 241 at an output field count of 7 and an output bit count of 12, which when applied to the JK flip-flop 195 resets the MOXF output 193 to a logical zero level at the next clock pulse, which also steps the field and bit count up one, to a field count of 0 and a bit count of 0. The OFC-0 output 227 is applied through the OR gate 205 to the count enable input 207 to cycle the bit count through field 0 after the MOFX output 193 has been reset to a logical zero level. The OBC-12 output 217 will enable the output field counter 223 to be counted up at the next clock pulse which will stop the output field counter 223 at a count of 1 and the output bit counter 197 at the unusual count of 13. The output bit and field counter logic now is ready to receive the next MOR signal 185 and to repeat the above-described bit and field count cycle.

At the beginning of a refresh cycle, later described, a logical one level pulse on an RFT-1 output 261 clears to zero the output bit count of the output bit counter 197 through the OR gate 199 and the clear enable input 201. The RFT-1 output 261 also is used to clear to zero the output field count of the output field counter 223 through a clear enable input 202.

Specific decoded bit and field counts of the output bit counter 197 and the output field counter 223 are utilized to generate the output read request granted (ORDG) output 183 and an output write request granted (OWRG) output 241, see FIG. 8. The ORDG output 183 and the OWRG output 241 are used to read data out of and re-write data into the memory 75, see FIG. 5. With continued reference to FIG. 8, the OBC-6 output 215 and the OFC-0 output 227 feed a two input AND gate 243 which in turn feeds one of the inputs of a three-input OR gate 247. Other inputs to the OR gate 247 are provided by the OBC-12 output 217, and an RFT-2 output 245. A logical one pulse occurs on the RFT-2 output 245 one clock period following the generation of a pulse on a RFT-1 output 261, see FIG. 9, which is employed to initiate a target data message output 261 of the AND gate 271. Twenty-four milliseconds thereafter, the RFT output 269 of the J-K flip-flop 267 will be set to a logical one level. Then, at a time when the output field count is 0 and the output bit count is 2, the OIP flip-flop 275 will be reset by a logical one level output from the AND gate 280. The resetting of the OIP flip-flop 275 places a logical one level on he OIP output 273. If the IIP line 25 is also at a logical one level then in the next clock time period, the logical one level generated thereby on the RFT-1 output 261 of the AND gate 271 resets the J-K flip-flop 267, which in turn causes the RFT-1 output 261 to be at a logical zero level.

A logical one level pulse on the RFT-1 output 261 will again set the OIP output 187 of the OIP flip-flop 275 to a logical one level thereby repeating the refresh cycle.

The CRT display refreshing period for which the OIP output 187 is at a logical one level may be shortened by the occurence of memory saturation as indicated by a logical one level on the MLIM output 285 of MLIM flip-flop 287. This latter condition signifies that all of the memory addresses available for refreshing and not reserved for input target data assembly have been cycled through during one refresh period. Also the refreshing period will be concluded in less than 24 milliseconds if in the refreshing cycle, the target data message outputting process reaches a message which has been stored in the memory 75 for a period of time equal to the sum of the time set by the target time set control 67 and the time set by the trail time set control 283. The outputting from the memory 75 of such a stale message will result in a logical one level being generated at the TTGZ output 279 of the trail time comparator 281. Thus, in the preferred embodiment, target data messages refresh outputting cycle, as will be described hereinafter.

The OR gate 247 produces an output read request (ORDQ) output 249, which is at a logical one level, at the time a logical one level pulse occurs on the RFT-2 output 245; at the time the output bit counter 197 cycles through a bit count of 12; and at the time the output bit counter 197 cycles through a bit count of 6 when the output field counter 223 is set to a count of 0.

The ORDQ output 249 feeds a two-input AND gate 251 which is also fed by an NOT IWRQ ($\overline{IWRQ}$) output 253 of an inverter 255 driven by the input write request (IWRQ) signal 93. Thus, the AND gate 251 serves to block the granting of an output read request whenever there is an input write request as indicated by a logical one level on the IWRQ signal 93.

A two-input AND gate 257 fed by the OFC-0 output 227 and the OBC-2 output 213 generates a logical one level output hereinafter referred to as the output write request (OWRQ) output 259 whenever the output field count is 0 and the output bit count is 2. The OWRQ output 259 feeds a two-input AND gate 261 which is also fed by the $\overline{IWRQ}$ output 253 from the inverter 255. The output of the AND gate 261 is hereinafter referred to as the output write request granted (OWRG) output 241. Thus, the AND gate 261 serves to block the granting of an output write request whenever there is an input write request.

The target data messages stored in the memory 75, see FIG. 5, are read out and sent to the CRT display system (not shown) once very 24 milliseconds thereby continually refreshing the display at a rate sufficient to generate a steady flicker-free display presentation. The control signals to create this periodic generation of target data messages are derived from the refresh control logic circuits, see FIG. 9.

The refresh control logic generates a clock-synchronized refresh timing pulse once every 24 milliseconds, hereinafter referred to as the RFT-1 output 261. Input pulses occuring at a rate of every 3 milliseconds and which may be generated internally by a separate pulse generator (not shown) or provided by external circuitry associated with a radar CRT display system, are divided by eight through the operation of a three-bit refresh counter 263 and a standard counter decoder 265 to generate pulses occuring every 24 milliseconds, which are utilized to enable the J input of a J-K flip-flop 267. The Q output of the J-K flip-flop 267, hereinafter referred to as the RFT output 269, is fed back to the K input of the J-K flip-flop 267 through a three-input AND gate 271. The other two inputs to the AND gate 271 are the $\overline{IIP}$ line 25, see FIG. 4, which is at a logical one level when there is no input-in-progress ($\overline{IIP}$), and $\overline{OIP}$ output 273 of an OIP flip-flop 275. The $\overline{OIP}$ output 273 is at a logical one level when there is no output-in-progress ($\overline{OIP}$).

When both the $\overline{IIP}$ line 25 and the $\overline{OIP}$ output 273 are at a logic one level, the output of the AND gate 271, previously identified as the RFT-1 output 261, enables the K input of the J-K flip-flop 267 thereby resetting the J-K flip-flop 267 at the next clock pulse causing the RFT output 269 to change to a logical zero level which when applied as an input to the AND gate 271 resets the RFT-1 output 261 to a logical zero level. Thus the RFT-1 output 261 produces a clock-synchronized pulse once every 24 milliseconds which is used as the main refreshing timing pulse for the refresh system.

The RFT-1 output 261 also is used to set the J input of the OIP flip-flop 275 thereby producing a logical one level on the Q output of the OIP flip-flop 275 previously identified as the OIP output 187. The OIP flip-flop 275 is reset by the output of a three input AND gate 280. One of the three inputs to the AND gate 280 is from the output of a three input OR gate 277. The first input to the OR gate 277 is a TTGZ output 279 of a trail-time comparator 281, see FIG. 5. The TTGZ output 279 is at a logical one level when a message being outputted from the memory 75 has been displayed as a trail signal for a period equal to the time set for trail display by a trail time set control 283, see FIG. 5.

Figure 9:
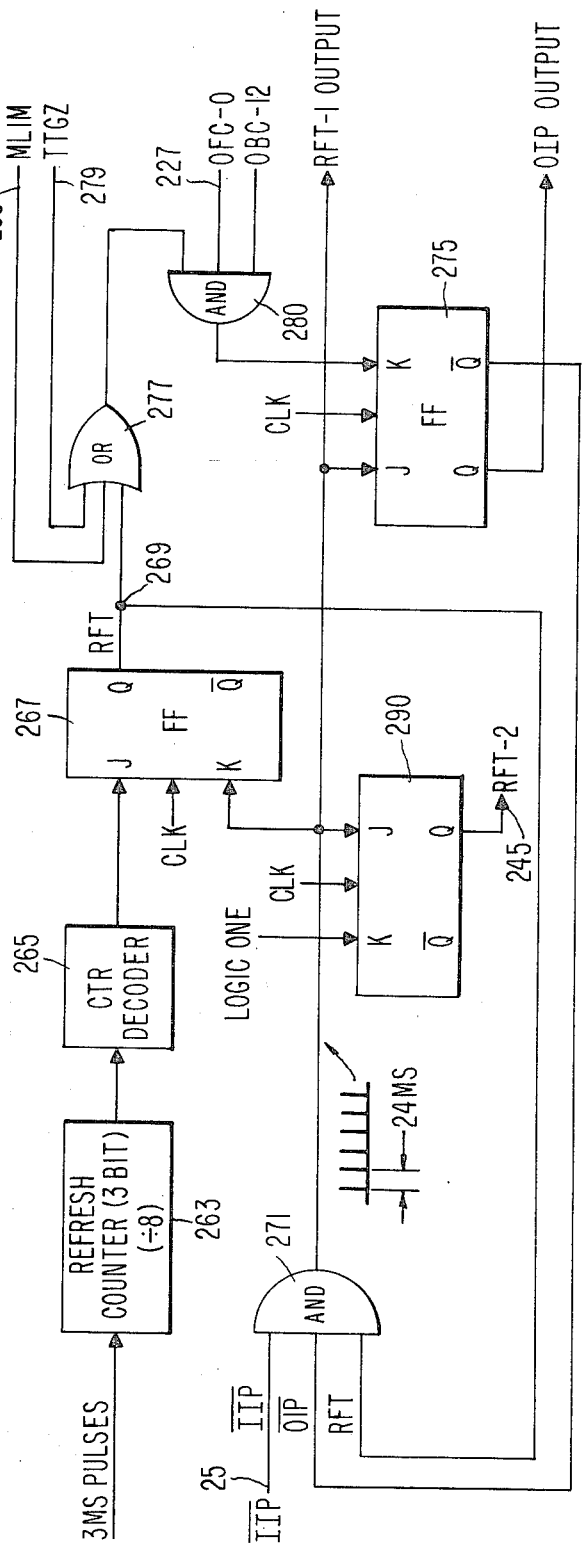
FIG. 9 is a diagram of a refresh control logic circuit which generates refresh control signals for utilization in the refresh system of FIG. 5.

With continued reference to FIG. 5 and specific reference to FIG. 9, the second input to OR gate 277 is a MLIM output 285 of an MLIM flip-flop 287. A logical one level on the MLIM output 285 indicates that memory saturation has occurred with the outputting target data address being the number of addresses reserved for incoming target message assembly above the field 0 address of the last input target data message before the beginning of a current output refreshing cycle. The third input to OR gate 277 is the RFT output 269 of the J-K flip-flop 267.

As discussed, the output of the OR gate 277 provides one input to three-input AND gate 280. The other two inputs to the AND gate 280 are provided by the OFC-0 output 227 and the OBC-2 output 213. The output of the AND gate 280 is utilized to reset the OIP flip-flop 275, thereby producing a logical zero level on the OIP output 187.

In the operation of a complete refresh cycle, the OIP output 187 of the OIP flip-flop 275 will be set to a logical one level by a logical one level pulse on the RFT-1 are repeatedly read out of memory 75 once every 24 milliseconds and outputted to the CRT display system so as to refresh the target display and create a steady flicker-free display presentation.

A logical one level clock period duration pulse on the RFT-1 output 261 is also utilized to generate a logical one level clock period duration pulse on the Q output, previously identified as the RFT-2 output 245, of J-K flip-flop 290. The RFT-1 output 261 is provided to set the J input of flip-flop 290 while a voltage at a logical one level is permanently applied to the reset or K input of the J-K flip-flop 290. Thus, the J-K flip-flop 290 is set by the pulse on the RFT-1 output 261 and reset one clock time period later.

The refresh cycle of addressing the memory 75 for the reading out of target data messages from the memory 75 is initiated by the generation of a logical one level on the OIP output 187 and the generation of a logical one level pulse on the RFT-1 output 261. The logical one level pulse on the OIP output 187 via the AND gate 191, see FIG. 7, initiates the output data bit and field counter logic whenever the MOR signal 185 is at a logical one level indicating that the CRT display unit is ready to accept more target messages for display. The logical one level pulse on the RFT-1 output 261 through the OR gate 199 and the clear enable input 201 clears the output bit counter 197 to the count of 0. In addition the logical one level on the RFT-1 output 261 is applied to the clear enable input 202 of the output field counter 223 to clear the count therein to a field count of 0.

With continued reference to FIG. 5, the RFT-1 output 261 is also applied to the control inputs of a control AND circuits 289 and 291. The control AND circuit 289, when enabled by a pulse on the RFT-1 output 261 serves to load the address stored in the load point register 85, representing the field 0 address of the last inputted target data message, into a 10-bit refresh down counter 293. The control AND circuit 291, when enabled by a pulse on the RFT-1 output 261, serves to load the adder output 147 of the adder 145 into a 10-bit refresh limit register 295. The adder output 147 will be the sum of the field 0 address of the last inputted target data message fed to the adder 145 from the load point register 85 through the second adder input 149, and the binary number representation present at the first adder input 143. The first adder input 143 receives its data through the OR gate 141 via a control AND circuit 297 at the time there is a logical one level pulse on the RFT-1 output 261. The control input of the control AND circuit 297 is fed by the RFT-1 output 261, while the data input to the control AND circuit 297 is fed by a pre-wired parallel binary representation of the numeral twenty-four (24). Thus, when a logical one pulse appears on the RFT-1 output 261, the numerical data representing the numeral 24 is outputted through the OR gate 141 to the first adder input 143, thereby generating at the adder output 147 an address representation which is 24 address locations above the field 0 address of the last inputted target data message.

The adder output 147 is fed to the data input of control AND circuit 281. The control input of the control AND circuit 291 is enabled by a logical one pulse appearing on the RFT-1 output 261, which serves, via the control AND circuit 291, to load the address representation of the address 24 address locations above the last inputted field 0 address into the refresh limit register 295.

The address stored in the refresh down counter 293 is clocked down one address location at a time when there is a logical one level on a count enable input 299 of the down counter 293. The count enable input 299 is is fed by a two-input AND gate 301 having as inputs, the ORDG output 183 and the output of a five-input OR gate 303. The OR gate 303 is fed by the OFC-0 output 227, the OFC-1 output 229, the OFC-2 output 231, the OFC-3 output 233, and a 7FT output 305 of a flip-flop 307, see FIG. 11. The 7FT output 305 is at a logical one level from the time of an output field count of 0 and an output bit count of 2 through the time of an output field count of 7 and an output bit count of 0 when a beacon-type target data message is being read out of the memory 75. Remembering that the ORDG output 183 is at a logical one level at output bit counts of 6 and 12 for an output field count of 0 and at an output bit count 12 only for every field count thereafter, it can be seen that the refresh down counter 293 is decremented five addresses during a search-type message read-out and eight addresses during a beacon-type message read-out.

The address stored in the reference down counter 293 is fed to a data input of a control AND gate 309. A control input for control AND gate 309 is fed by the output of a two-input OR gate 311 having as inputs the ORDG output 183 and the OWRG output 241. When either the ORDG output 183 or the OWRG output 241 is at a logical one level, address data flows from the refresh down counter 293 through the control AND gate 309 and the address OR gate 153 to the memory address input 79 of the memory 75.

The address stored in the refresh down counter 293 is continually compared with the address stored in the refresh limit register 293 by a memory limit (MLIM) comparator 313. When address coincidence occurs, an output signal from the MLIM comparator 313 sets the MLIM flip-flop 287, thereby producing a logical one on Q output of MLIM flip-flop 287 heretobefore defined as the MLIM output 285. The MLIM flip-flop 287 is reset by logical one level signal on the RFT-1 output 261.

Target data messages stored in the memory 75 are read out field by field through the target data output 83 whenever the control AND circuit 177 is enabled by the output read request granted (ORDG) output 183 to pass bits 1 through 8 of the field being read into the 8 bit up-counter 179 and bits 9 through 12 into the 4 bit register 181. Because of the sequence in which messages are inputted and stored in the memory 75, see FIG. 6, the first field of a target data message to be read out of the memory 75 will be field 0. Once the field 0 of a message has been loaded into the 8-bit up-counter 179 and the 4-bit register 181, certain bits of the field 0 are read and decoded to generate control output signals which will determine the display mode of the target data message.

Figure 10:
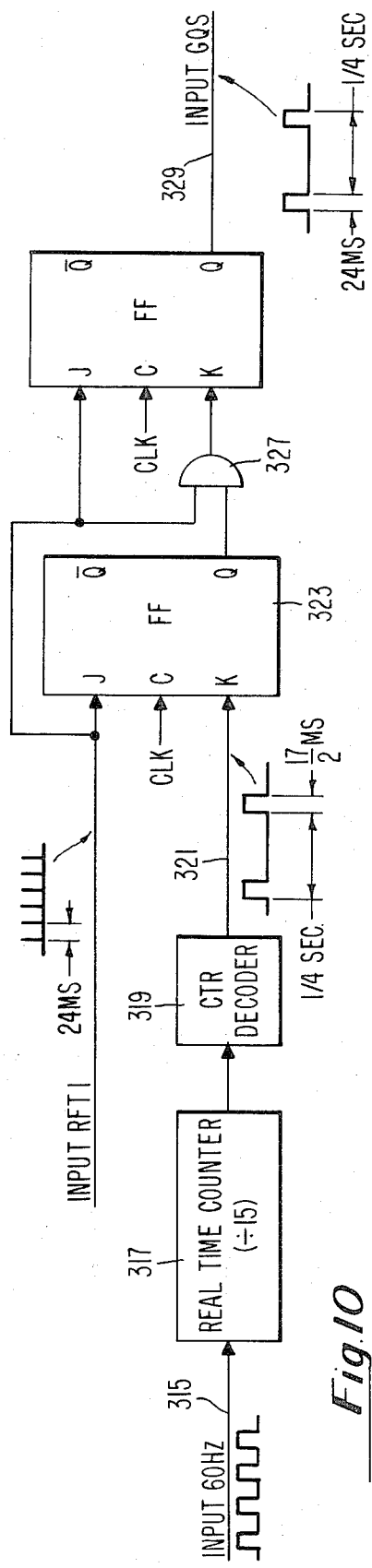
FIG. 10 is a diagram of a real time control logic circuit which generates display timing pulses for the refresh system of FIG. 5.

It is also during the time that bits 1 through 8 of a field 0 are stored in the 8-bit up-counter 179 that bits 1 through 8 are counted up at the rate of one bit every one-quarter of a second by a real time control logic circuit, see FIG. 10. In the preferred embodiment, a 60 Hz input signal 315 which may be derived from the standard power line frequency is divided by 15 in a conventional manner by a real time counter 317. The output of the real time counter 317 is decoded by a counter decoder 319 to generate a decoder output signal 321 of pulses periodically occurring once every one-quarter of a second. The decoder output signal 321 sets the Q output of a J-K flip-flop 323. The J-K flip-flop 323 is reset by the RFT-1 output 261 which generates a single clock pulse once every 24 milliseconds. The RFT-1 output 261 also resets a J-K flip-flop 325. The J-K flip-flop 325 is set by the output of a two-input AND gate 327 having as inputs, the RFT-1 output 261 and the Q output of the J-K flip-flop 323. The Q output of the J-K flip-flop 325, hereinafter referred to as GQS output 329, produces a 24 millisecond pulse initiated by the RFT-1 output 261 and repeated every one-quarter of a second. With reference to FIG. 5, the GQS output 329 is applied as one input of a three-input AND gate 331. The other inputs to AND gate 331 and the OFC-0 output 227 and the OBC-2 output 213. The output of AND gate 331 drives a count enable input 333 of the 8-bit up-counter 179 thereby enabling the count contained therein to be incremented one bit every one-quarter of a second at a time when the output field count is 0 and the output bit count is 2.

Figure 11:
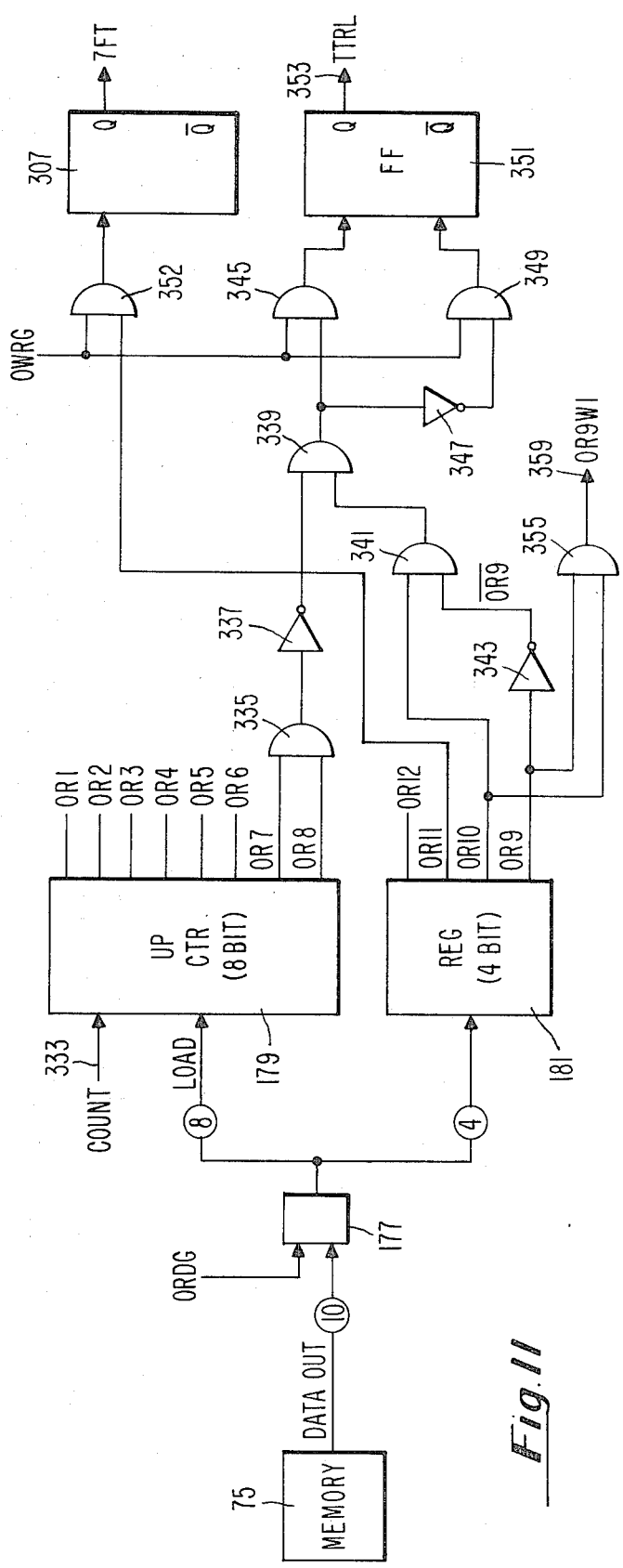
FIG. 11 is a schematic of a trail display control circuit which generates trail display information for the refresh system of FIG. 5.

With reference to FIG. 11, both the up-counter 179 and the 4-bit register 181 are comprised of clocked J-K flip-flop elements as are all other counters and registers of the preferred embodiment. Therefore, due to the finite inherent storage capability of the J-K flip-flop elements, the count or load enable inputs of the counters and registers may be activated to count or accept new data at the same clock pulse which enables the currently stored data to be read out therefrom, since the data is not actually changed at the counter or register output until the clock pulse following the count or load enable activation.

With continued reference to FIG. 11, the data bits 1 through 8 stored in the 8-bit up-counter 178 may be read at outputs OR-1 through OR-8, respectively, of the up-counter 179. Likewise, the data bits 9 through 12 stored in the 4-bit register 181 may be read at outputs OR-9 through OR-12, respectively, of the register 181. Recalling that bit 7 and bit 8 of a control field 0 are initially set to a logical one level and that bits 1 through 6 are set to the complement of the target time setting of the target time set control 67 and are counted up in one-quarter of a second increments with bit 1 representing the least significant bit, see FIG. 3, it can be seen that bit 7 and bit 8 will remain at a logical one level until the target time setting of the target time set control 67 has expired, at which time bits 1 through 6 will be all at a logical zero level. The next count pulse appearing at the count enable input 333 of the up counter 179 will set bits 1 through 6 all to a logical one level and bit 7 to a logical zero level, thereby producing a logical one level on the up counter 178 outputs OR-1 through OR-6 and a logical zero level on output OR-7. Thus, once the pre-set target display time of a target data message has expired, there will not be a logical one level present at both the up counter 178 outputs OR-7 and OR-8 while the up-counter 178 is storing the control field 0 of that target data message. A two-input AND gate 335 having as inputs the up-counter 178 outputs OR-7 and OR-8, will output a logical one level signal when the up-counter 178 is storing bits 1 through 8 of the field 0 of the target data message which has been stored in the memory 75 for a period of time less than that set by target time set control 67, and a logical zero level signal when the up-counter 167 is storing bits 1 through 8 of the field 0 of a message which has been stored in the memory 75 for a period of time greater than that set by the target set control 67. The output of the AND gate 335 is logically inverted by inverter 337 and fed as one input of a two-input AND gate 339. The second input of the AND gate 339 is fed by the output of a two-input AND gate 341. The inputs of the AND gate 341 are fed by the OR-10 output of 4 bit register 181 and the output of an inverter 343 which logically inverts the OR-9 output of 4 bit register 181. Recalling that a trail presentation of a target data message is allowed when bit 10 of the control field 0 of a target data message is set to a logical one level and bit 9 is set to a logical zero, see FIG. 3, it can be seen that the output of the AND gate 341 will be at a logical one level signifying that a trail presentation is allowed when ever the register 181 is storing bits 9 through 12 of a target data message field 0 having bit 10 set at a logical one level and bit 9 sets at a logical zero level.

The output of the AND gate 339 is applied directly as one input of a two-input AND gate 345, and is applied via an inverter 347 to one input of a two-input AND gate 349. The second inputs of the AND gates 345, 349 are fed by the OWRG output 241, which produces a logical one level pulse at the time the output field count is 0 and the output bit count is 2. As will be described, the field 0 of a target data message will be in the up-counter 178 and the 4 bit register 181 at the time of the pulse appears on the OWRG output 241. The AND gate 345 sets a J-K flip-flop 351 producing a logical one on the Q output of J-K flip-flop 351, hereinafter referred to as the TTRL output 353. A logical one of the TTRL output 353 indicates that the message being read out of the memory 75 has been stored therein for a period greater than the target display time set by the target time set control 67 and that a trail presentation of that message is allowed.

If the target data message being read out of the memory 75 is of beacon-type comprising seven information fields and a control field 0, the 7FT output 305 of J-K flip-flop 307 will be set to a logical one level. The J-K flip-flop 307 is set by the output of a two-input AND gate 352 having as inputs the OR-11 output of the 4 bit register 181 and the OWRG output 241. The J-K flip-flop 307 is reset by the OFC-7 output 235.

A two-input AND gate 355 receives as inputs the OR-9 and OR-10 outputs of the 4 bit register 181 and generates an output, hereinafter referred to as the OR9W1 output 359. After the field 0 of a target data message is read, it is rewritten into the memory 75 through a control AND circuit 357, the memory input OR gate 71, and the memory data input 73 of the memory 75, see FIG. 5. If the target data message was initially written into the memory 75 with bit 10 and bit 9 of the control field 0 set to a logical zero level and a logical one level, respectively, the first time the field 0 of that message is loaded into the up-counter 179 and the 4 bit register 181, the OR9W1 output 359 will be at a logical zero level. If the OR9W1 output 359 instead of the OR-9 output of 4 bit register 181 is re-written into the memory 75 as bit 9 of the control field 0, an initial setting of bit 9 to a logical one level and of bit 10 to a logical zero level will be read only once as a logical one and a logical zero, respectively and both as logical zero thereafter. Simple additional detection and control circuits (not shown) may be incorporated into the refresh system of the instant invention to allow the outputting to a CRT display system target data messages having bit 9 of field 9 set to a logical one level and bit 10 set to a logical zero level, and for inhibit the outputting of target data messages having both bits 9 and 10 of a field 9 set to a logical zero level. Thus, a test or otherwise special message may be outputted by a CRT display system once and not refreshed thereafter. The discussion of the possible application of the OR9W1 output 359 is included in this specification to illustrate the display mode flexibility of the refresh system of the present invention.

After the filed 0 of a target message is read out of the memory 75, the remaining four fields of a search type message or the seven fields of a beacon type message are sequentially read out of the memory 75. The generation of a logical one level pulse on the RFT-1 output 261 loads (1) the last inputted control field 0 address of a target data message into the refresh down counter 293; (2) loads the refresh limit register 295 with an address representation 24 address locations above the last inputted control field 0 address, and (3) clears both the output field counter 223 and the output bit counter 197 to a count of zero. One clock pulse later, a logical one level on the ORDG output 183 addresses the memory 75 with the control field 0 address currently stored in the refresh down counter 293 through the control AND circuit 309, the address OR gate 153 and the memory address input 79 of the memory 75. The ORDG output 183 also loads via the control AND circuit 177 the up-counter 179 and the 4 bit register 181 with the control field 9 stored in memory 75 at the address loaded into the refresh down counter 293 by the RFT-1 output 261. Finally, the ORDG output 183 through the AND gate 301 steps the refresh down counter 293 down one address to the field 1 address of the last inputted target data message.

The output bit field counter 197 begins counting from the time of the logical one pulse on the RFT-1 output 261. At an output bit count of 2, bits 1 through 8 of the control field 0 stored in the up-counter 179 will be stepped up one bit (representing an elapsed display time of one-quarter of a second) if the GQS output 329 which is applied as an input to the OR gate 331, is at a logical one level. Also at a output bit count of 2, the control field 0 in the up counter 179 will be rewritten into the memory 75 (at the same address the field currently occupies) through the control AND circuit 357, the memory data input OR gate 71 and the memory data input 73 of the memory 75. The above described sequence continually updates the information in the field 0 of the target data messages stored in the memory 75. The output bit counter 197 continues to cycle through an output field count of 0 and at an output bit count of 6, a logical one level pulse on the ORDG output 183 will load a message field 2 address into the refresh down counter 293 while field 1 of the same message will be loaded into the up counter 179 and 4 bit register 181. At an output bit count of 12, the ORDG output 183 will load a message field 3 address into the refresh down counter 293 and will also load the field 2 of the same message into the up counter 179 and 4 bit register 181.

Also at the output bit count of 12, the OBC-12 output 217 and the output of the AND gate 301 are provided as the control inputs to a control AND circuit 361 which has as a data input the outputs of the up counter 179 and the 4 bit register 181. The output of the control AND circuit 361 loads a 12 bit output shift register 363. Thus, at an output bit count of 12, during an output field count of 0, the field 1 of a target data message is loaded from the up counter 179 and the 4 register 181 into the output shift register 363. If an associated CRT display system is not ready to receive a target data message as signified by a logical zero level of the MOR signal 185, see FIG. 7, the output bit counter 197 will stop at the abnormal count of 13 and the output field counter 223 will stop at the count of 1.

Thereafter, as soon as the MOR signal 185 is at a logical one level, the SXMT output 190 of the detector 189 generates a logical one level pulse which clears the output bit counter 197 to the count of zero. With continued reference to FIG. 5, the SXMT output 190 also applied as one input of a two-input AND gate 365. The other input to the AND gate 365 is provided by the TTRL output 353 of the J-K flip-flop 351 which indicates, by a logical one level, that the field 1 stored in the output shift register 363 is the first field of a message which should be displayed as a trail message, and by a logical zero level, that the field 1 stored in the output shift-register 363 is the first field of a message which should be displayed as a target message.

The output of the AND gate 365 is applied one input of a two-input OR gate 376. The other input of the OR gate 367 is provided by the output of the output shift register 363. The OR gate 367 outputs to an associated CRT radar display system. Thus, as soon as a logical one level pulse appears at the SXMT output 190, information is transferred to an associated display system indicating whether the next message outputted from the output shift register 363 should be displayed as a target or trail indicia.

The next clock pulse following the generation of a logical one level pulse on the SXMT output 190 will produce a logical one level pulse on the MOXF output 193 indicating that a message output transfer is in progress. With continued reference to FIG. 5, the MOXF output 193 is applied as one input to a two-input AND gate 369. The second input of the AND gate 369 is provided by the $\overline{OBC-12}$ output 221 which is at a logical one level for all output bit counts other than a bit count of 12. The output of the AND gate 369 feeds the shift enable input of the output shift register 363.

The clock pulse following the setting of the MOFX output 193 to a logical one level will start the shifting of field 1 of a target data message out of the output shift register 363 through the OR gate 367 to an associated radar CRT display system. The output shifting will continue bit-by-bit through an output bit count of 12. The next clock pulse will load field 2 of a target data message into the output shift register 363 and will set the output field count 223 to count of 2 and the output bit counter 197 to a count of 0. Field 2 of the message will then be shifted out bit-by-bit. The sequence of loading a field into the output shift register 363 following an output bit count 12, and then shifting the entire field out therefrom bit-by-bit until the next output bit count of 12 occurs, will continue field-by-field for outputting a beacon type target data message of seven data fields. Thereafter, the output bit counter 197 cycles through field 0, thereby loading field 1 of the next target data message into the output shift register 363. The output bit counter 197 stops at the abnormal bit count of 13 with the output field counter 223 set to a field count of 1. At this time, field 1 of the next target data message is already loaded into the output shift register 363, and the refresh system is awaiting the next message output request from the associated CRT display system, as indicated by a logical one level MOR signal 185.

Employing a 3 megahertz clock, the refresh system can serially output a data field comprising 12 bits in approximately 4 microseconds. In the preferred embodiment, approximately 100 microseconds are required to display a target a target data message. Therefore, a second message output request is never generated before a first message output request has generated a complete message output transfer cycle ending with the loading of field 1 of the next target data message into output shift register 363.

When a search type message is to be outputted, the first four data fields of the message are shifted out of the output shift register 363 as are the first four data fields of a beacon type message. However, when outputting a search type message, a logical one level does not occur at the output of the AND gate 301 during the output field counts of 4, 5, 6, and 7. Since the AND gate output 301 is provided as a control input to the control AND circuit 361, which controls the loading of the output shift register 363, loading is inhibited into the output shift register 363 during these field counts. Consequently, three fields comprising data bits of logical zeroes are shifted out of the output shift register 363 immediately following the outputting of the fourt data fields of a search type message.

Summarizing, target data messages serially enter the refresh system and are stored in a virtual push-down stack memory of the non-destruct read-out type and are repeatedly outputted from the refresh system for a selectable period of time at a rate sufficient to generate a flicker-free CRT presentation of the target data messages. Identification of the data to be displayed as either that derived and stored during a radar antenna's most recent scan or that generated by prior scans provides the option of displaying a target's current position by one indicium and its previous positions by other indicia. In the preferred embodiment, the target data messages comprise either four or seven data fields of 12 bits each. It is apparent that the refresh system of the present invention may be readily modified to accommodate messages comprising other data field lengths and fields comprising other bit lengths.

From the foregoing description of the invention, it should be apparent that the present radar target data refreshing system provides an efficient and reliable means for refreshing a CRT display system with radar target data at a rate sufficient to produce a flicker-free presentation of the radar target data. The embodiment of the invention described herein is that of a successfully operative system. However, it should be understood that changes and modifications of the described arrangements may be needed to fit particular operating requirements. These changes and modifications, insofar as they are not departures from the true scope of the present invention, are intended to be covered by the claims appended hereto.

What is claimed is:

1. The process of generating a flicker-free display in a radar display system for receiving and displaying each of a plurality of digitized radar target data messages for a preselectable display period, comprising the steps of:

appending to each of said received digitized radar target data message a control field including a display time sub-field defining a display time;

storing sequentially each of said appended received digitized radar target data message;

reading non-destructively each of said stored appended received digitized radar target data message on a last in - first out basis;

sending to said display system each of said read digitized radar target data message;

repeating said steps of reading and sending at a rate responsive to the persistence characteristics of said display system for generating a steady flicker-free display presentation of each of said received digitized radar target data messages;

modifying periodically said defined display time of said sub-field of said stored appended control field of each of said digitized radar target data message sent;

comparing said modified display time of said subfield of each of said sent radar target data message with said preselectable display period for coincidence detection; and inhibiting the further sending of each of said digitized radar target data message for which said coincidence is detected.

2. A radar target display refreshing apparatus for receiving, storing and repeatedly sending to a display system having a known finite display persistence a plurality of digitized radar target data messages comprising:

means for selectably setting a radar target data message display period including data for timing said display period;

message control means for appending to each of the messages a control field including said data for timing;

memory means for sequentially storing each of said received messages with its appended control field;

means for non-destructively reading on a last in - first out basis each of said stored messages with its appended control field;

refreshing means for repeatedly activating said reading means and for sending to the display system said messages at a rate determined by the persistence characteristics of said display system for generating a flicker-free display presentation of each of said radar target data messages;

means responsive to said timing data for clocking said display; and display control means responsive to said period setting means and said clocking means for permitting the repeated sending of each of said messages by said refreshing means for a time equal to said selectably set display period and for inhibiting said sending thereafter.

3. The radar target display refreshing apparatus according to claim 2 wherein said display system includes the capability of displaying data through a plurality of indicia and wherein said display period setting means includes:
means for selectively setting a first portion of said radar target data message display period including said timing data; and
means for selectably setting the remaining portion of said radar target data message display period; and wherein said refreshing means includes:
detection means responsive to said period selecting means and to said clocking means for generating a signal indicative of whether the elapsed time of display of each of said messages is in said first portion or said remaining portion of said display period; and
means for appending said generated signal to each of said radar target data messages sent to the display system to control the display thereof, thereby displaying one indicium during said first portion of said selectable display period and another indicium thereafter.

4. The radar target display refreshing apparatus according to claim 3 wherein said first portion display setting means includes:
means for initially setting said timing data to the binary complement of a binary number representing said selectably set first portion of said radar target data message display period.

5. The radar target data display refreshing apparatus according to claim 4 wherein said clocking means includes:
means for periodically bit-by-bit incrementing at a constant rate said binary complement representation, said rate being selected to increment said binary complement representation to the binary representation of zero in a period of time equal to said selectably set first portion of said radar target data message display period.

6. The radar target data display refreshing apparatus according to claim 5 wherein said detection means includes:
logic gating means for generating a signal of one binary logic level indicating that said binary complement representation has not been incremented to the binary representation of zero and of a second binary logic level signal indicating otherwise;
means for latching said generated indicating logic level signal from substantially the time of reading of said control field of one target data message out of said memory means to the time of reading of the next said control field; and
wherein said generated signal appended means includes:
means for prefixing said latched signal of said logic gating means to each of said sent messages.

7. The radar target display refreshing apparatus according to claim 5 wherein said message control means includes:

means cooperating with said first portion display setting means for positioning the least significant digit of said binary complement representation contiguous to one end of said control field; and
means for setting to a logical one level all of a plurality of bits in a part of said control field, said part being adjacent to said binary complement representation and being responsive to said bit-by-bit incrementing means whereby said plurality of bits function as digits of greater significance than the most significant digit of said binary complement representation.

8. The radar target data display refreshing apparatus according to claim 7 wherein said detection means also includes:
logical AND circuit means monitoring said plurality of bits for generating a logical level signal when at least one of said plurality of bits has been incremented to a logical zero level thereby indicating that said binary representation has been incremented to logical zero; and
means for latching said generated logic level signal from substantially the time of reading of said control field of one target data message out of said memory means to the reading of next said control field.

9. The radar target display refreshing apparatus according to claim 7 wherein said remaining portion display setting means includes:
means for generating a binary number representing said selectably set remaining portion of said radar target data message display period;
means for comparing said generated binary number representing said selectably set remaining portion of said radar target data message display period with said binary number represented by said binary complement representation and said plurality of bits, as incremented by said clocking means, of the individual message being read of said plurality of messages;
means responsive to said comparing means for generating a signal indicating equality of said generated number representing said selected remaining portion of said message display period and said binary number represented by said binary complement representation and said plurality of bits, as incremented by said clocking means; and
wherein said signal indicating equality defines the end of said selectably set display period.

10. The radar target display refreshing apparatus according to claim 9 wherein said message control means includes:
means cooperating with said first portion display setting means for positioning the least significant digit of said binary complement representation contiguous to one end of said control field; and
means for setting to a logical one level all of a plurality of bits in a part of said control field, said part being adjacent to said binary complement representation and being responsive to said bit-by-bit incrementing means whereby said plurality of bits function as digits of greater significance than the most significant digit of said binary complement representation; and
wherein said detection means also includes:
logical AND circuit means monitoring said plurality of bits for generating a logic level signal when at least one of said plurality of bits has been incremented to a logical zero level thereby indicating that said binary representation has been incremented to logical zero; and means for latching said generating logic level signal from substantially the time of reading of said control field of one target data message out of said memory means to the reading of next said control field.

11. The radar target display refreshing apparatus according to claim 2 wherein said plurality of digitized radar target data messages comprises messages having an identical plurality of fields including a label field as the first field in each message immediately followed by a number of subsequent fields containing relevant information, said label field including an indication of said number of subsequent fields containing relevant information, all said plurality of fields having an identical plurality of bits; and wherein said message control means includes means for prefixing to each of said received messages said control field including said data for timing, said control field containing said identical plurality of bits; and wherein said memory means includes:

means for sequentially storing each of said received messages with its prefixed control field field-by-field in reverse order whereby the last field of each message is stored adjacent to said prefixed control field of the immediately preceding message.

12. The radar target display refreshing system according to claim 11 wherein said message control means further includes:

means for decoding said label field with respect to said indication of said number of subsequent fields containing relevant information; and means responsive to said decoding means for including within said prefixed control field at least one bit denoting the number of subsequent fields containing relevant information; and wherein said memory means also includes:

means responsive to said included at least one bit for storing only subsequent fields containing relevant information.

13. The radar display refreshing system according to claim 12 wherein said refreshing means also includes:

means responsive to said included at least one bit for suffixing to each said read radar target data message a field of said identical plurality of bits for each nonrelevant field not stored in said memory means, thereby sending to the display system only messages having said identical plurality of fields.

* * * * *

UNITED STATES PATENT OFFICE
CERTIFICATE OF CORRECTION

Patent No. 3,821,735           Dated June 28, 1974

Inventor(s) Murray Lasoff et al.

It is certified that error appears in the above-identified patent and that said Letters Patent are hereby corrected as shown below:

Column 1,  line 56, "The" should be --In--.

Column 2,  line  1, "pass" should be --past--;

"an" should be --the--;

line 47, after "control" insert --logic--;

line 58, "coun-" should be --con- --;

line 59, "sels" should be --soles--;

line 64, "counsel" should be --console--;

line 65, "counsel" should be --console--.

Column 4,  line 43, delete "while";

line 45 "rated" should be --generated--.

Column 5,  line  8, after "via" delete "a";

line 13, after "zeros" insert --)--;

line 39, delete "this will indicate that";

line 40, delete "that".

Column 6,  line  7, "36" should be --35--.

UNITED STATES PATENT OFFICE
CERTIFICATE OF CORRECTION

Patent No. 3,821,735　　　　　　　　　Dated June 28, 1974

Inventor(s)　Murray Lasoff et al.

It is certified that error appears in the above-identified patent and that said Letters Patent are hereby corrected as shown below:

Column 7,　line 23, "field 9" should be --field 0--;

line 28, delete "logical zero level and bit 9 will be set to a";

line 33, delete "only";

line 46, delete "As" and change "bits" to --Bits--;

line 47, before "bits" insert --whereupon--;

line 48, "after" should be --when--.

Column 8,　line 10, delete "a set of data lines outputting".

Column 9,　line 25, "and" second occurrence should be --AND--.

line 13 through line 42, delete everything after line 13 "memory 75." through and including line 42.

UNITED STATES PATENT OFFICE
CERTIFICATE OF CORRECTION

Patent No. 3,821,735    Dated June 28, 1974

Inventor(s) Murray Lasoff et al.

It is certified that error appears in the above-identified patent and that said Letters Patent are hereby corrected as shown below:

Column 9, line 67, after "99" change "," to --.-- and before "second" change "the" to --The--.

Column 10, line 7, after "incoming" insert all text after Column 9, line 13 "memory 75." through and including Column 9, line 42;

line 21, after "of" insert --a beacon type message and only the first four fields of--;

line 39, after "parallel" insert --binary--;

line 58, "OBC" should be --IBC-- and before "an" insert --and--.

Column 11, line 3, after "incoming" insert --search--;

line 8, before "repre-" insert --address-;

line 22, after "load" insert --point--;

line 40, delete "a";

line 54, "messages" should be --message--.

UNITED STATES PATENT OFFICE
CERTIFICATE OF CORRECTION

Page 4

Patent No. 3,821,735        Dated June 28, 1974

Inventor(s) Murray Lasoff et al.

It is certified that error appears in the above-identified patent and that said Letters Patent are hereby corrected as shown below:

Column 12, line 6,   "an" should be --a--;

line 7,   "MOX" should be --MOXF--;

line 8,   "an" first occurrence should be --a--;

Column 12, line 10,   "an" first occurrence should be --a--;

line 13,   "the" should be --an--;

line 18,   "or" should be --for--;

line 48,   "MOFX" should be --MOXF--.

Column 13, line 20,   "he" should be "the" and "IIP" should be --$\overline{\text{IIP}}$--.

line 12, through line 48,   delete all text after line 12 "message" through and including Column 13, line 48 "messages".

Column 15, line 16,   after "RFT-1" insert all text after Column 13, line 12 "message" through and including Column 13, line 48 "messages";

UNITED STATES PATENT OFFICE
CERTIFICATE OF CORRECTION

Patent No. 3,821,735  Dated June 28, 1974

Inventor(s) Murray Lasoff et al.

It is certified that error appears in the above-identified patent and that said Letters Patent are hereby corrected as shown below:

| | | |
|---|---|---|
| Column 15, line 40, | after "target" insert --data--. |
| Column 16, line 22, | delete "is" second occurrence; |
| line 40, | "reference" should be --refresh--. |
| Column 17, line 27, | "GOS" should be --GQS--. |
| Column 18, line 35, | "sets" should be --set--. |
| Column 19, line 18, | "9" second occurrence should be --0--; |
| line 19, | "inhibit" should be --inhibiting--; |
| line 21, | "9" should be --0--; |
| line 28, | "filed" should be --field--; |
| line 33, | before "loads" insert --(1)-- and after "loads" delete "(1)". |
| Column 21, line 26, | delete "a target" second occurrence; |
| line 45, | "fourt" should be --four--. |

Signed and Sealed this fourteenth Day of October 1975

[SEAL]

Attest:

RUTH C. MASON
Attesting Officer

C. MARSHALL DANN
Commissioner of Patents and Trademarks